US009952482B2

United States Patent
Rudolph et al.

(10) Patent No.: US 9,952,482 B2
(45) Date of Patent: Apr. 24, 2018

(54) OPTICAL APPARATUS AND METHOD FOR OUTPUTTING ONE OR MORE PHOTONS

(71) Applicant: The University of Bristol, Bristol (GB)

(72) Inventors: Terence Rudolph, London (GB); Mark Thompson, Bristol (GB); Jonathan Matthews, Bristol (GB); Damien Bonneau, Bristol (GB)

(73) Assignee: The University of Bristol, Bristol (GB)

( * ) Notice: Subject to any disclaimer, the term of this patent is extended or adjusted under 35 U.S.C. 154(b) by 0 days.

(21) Appl. No.: 15/260,446

(22) Filed: Sep. 9, 2016

(65) Prior Publication Data

US 2017/0075190 A1    Mar. 16, 2017

(30) Foreign Application Priority Data

Sep. 11, 2015 (GB) .................................. 1516131.8

(51) Int. Cl.
*G02B 6/12* (2006.01)
*G02F 1/35* (2006.01)
(Continued)

(52) U.S. Cl.
CPC .............. *G02F 1/3526* (2013.01); *G01J 1/42* (2013.01); *G02F 1/3536* (2013.01);
(Continued)

(58) Field of Classification Search
CPC ...... G02F 1/3526; G02F 1/365; G02F 1/3558; G02F 1/3536; G02F 1/3553; G02F 2201/06; G01J 1/42
See application file for complete search history.

(56) References Cited

U.S. PATENT DOCUMENTS 8,270,842 B2 * 9/2012 Watanabe ............. G02F 1/3534
398/152
2007/0228373 A1 10/2007 Takemoto et al.
(Continued)

FOREIGN PATENT DOCUMENTS

EP          2543957 A1 *  1/2013 ......... G01B 9/02001
WO    WO 2008/050938 A1    5/2008

OTHER PUBLICATIONS

Bonneau, D., et al., "Effect of Loss on Multiplexed Single-Photon Sources", Apr. 2015, available from http://arxiv.org/pdf/1409.5341v2.pdf [accessed Aug. 16, 2016].
(Continued)

*Primary Examiner* — Ellen Kim
(74) *Attorney, Agent, or Firm* — Kilpatrick Townsend & Stockton LLP

(57) ABSTRACT

There is presented an optical apparatus comprising first and second photon pair sources configured to convert at least one pump light photon into a first and second correlated signal and idler photon pairs. In one example, the apparatus is configured to use one of the signal and idler photons from the first correlated photon pair for controlling the conversion of the pump light photon in the second photon pair source. The apparatus may configured such that, at least one of the signal and idler photons from the first correlated photon pair is output from the first photon pair source onto an optical path wherein at least one of the signal and idler photons from the second correlated photon pair is output from the second photon pair source onto the optical path. A method is also provided for outputting one or more photons using the optical apparatus.

20 Claims, 12 Drawing Sheets

(51) Int. Cl.
*G01J 1/42* (2006.01)
*G02F 1/365* (2006.01)
*G02F 1/355* (2006.01)

(52) U.S. Cl.
CPC .......... *G02F 1/3553* (2013.01); *G02F 1/3558* (2013.01); *G02F 1/365* (2013.01); *G02F 2201/06* (2013.01)

(56) References Cited

U.S. PATENT DOCUMENTS

| | | | | |
|---|---|---|---|---|
| 2012/0051740 | A1* | 3/2012 | Arahira | H04B 10/70 398/28 |
| 2013/0089888 | A1* | 4/2013 | Woodward | G01J 1/42 435/34 |
| 2014/0099104 | A1* | 4/2014 | Peters | H04B 10/70 398/25 |
| 2014/0355998 | A1* | 12/2014 | Tanzilli | H04L 9/0852 398/141 |

OTHER PUBLICATIONS

Collins, M.J., et al., "Integrated spatial multiplexing of heralded single-photon sources", Nature Communications, 4, 2582, 2013.

Glebov, B.L., et al., "Deterministic generation of single photons via multiplexing repetitive parametric down-conversions", Applied Physics Letters, 103, 031115, 2013.

Hayat, et al., "Photon-number state on-demand source by cavity parametric down-conversion", Applied Physics Letters, 89, 171108, 2006.

Heuck, M., et al., "On-demand single photon emission based on dynamic photon storage on a photonic integrated circuit", Conference on Laser and Electro Optics, Munich, 2015.

Jennewein, T., et al., "Triple photons and triple slits, a new frontier in quantum mechanics tests", "IEEE Conference on Lasers and Electro-Optics (CLEO)", 2011, pp. 1-2, ISBN: 978-1-4577-1223-4; ISBN 1-4577-1223-7.

Ma, X., et al. "Experimental generation of single photons via active multiplexing", Phys. Rev A, 83, 043814, 2011.

Migdall, A.L., et al., "Tailoring single-photon and multiphoton probabilities of a single-photon on-demand source", Phys. Rev A, 66, 053805, 2002.

Mower, J., et al., "Efficient generation of single and entangled photons on a silicon photonic integrated chip", Phys. Rev A, 84 052326, 2011.

Yang, T., et al., "Experimental Synchronization of Independent Entangled Photon Sources", Feb. 2005, available from http://arxiv.org/pdf/quant-ph/0502146.pdf [accessed Aug. 16, 2016].

United Kingdom Application No. GB1516131.8, Search Report dated Feb. 22, 2016.

* cited by examiner

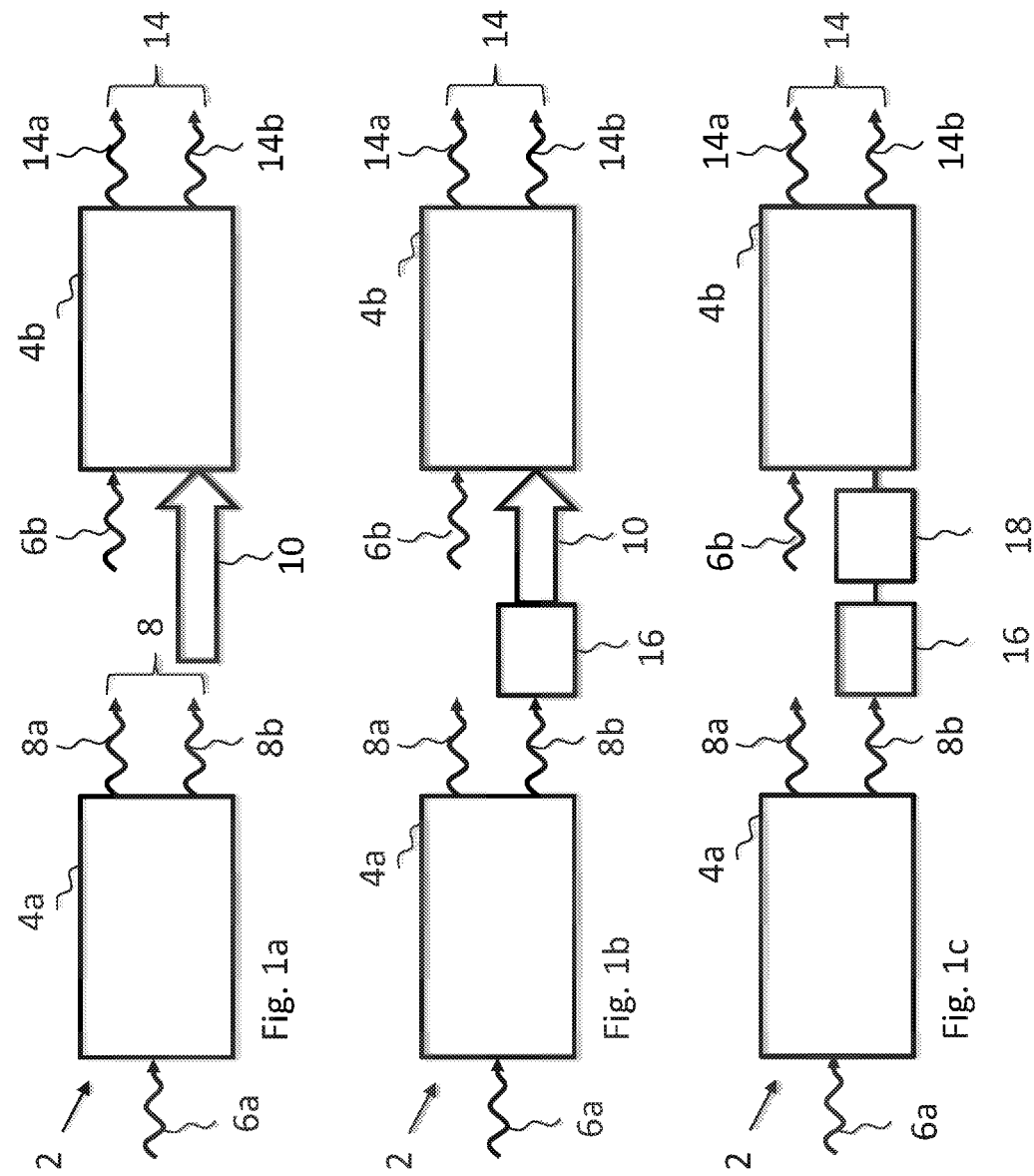

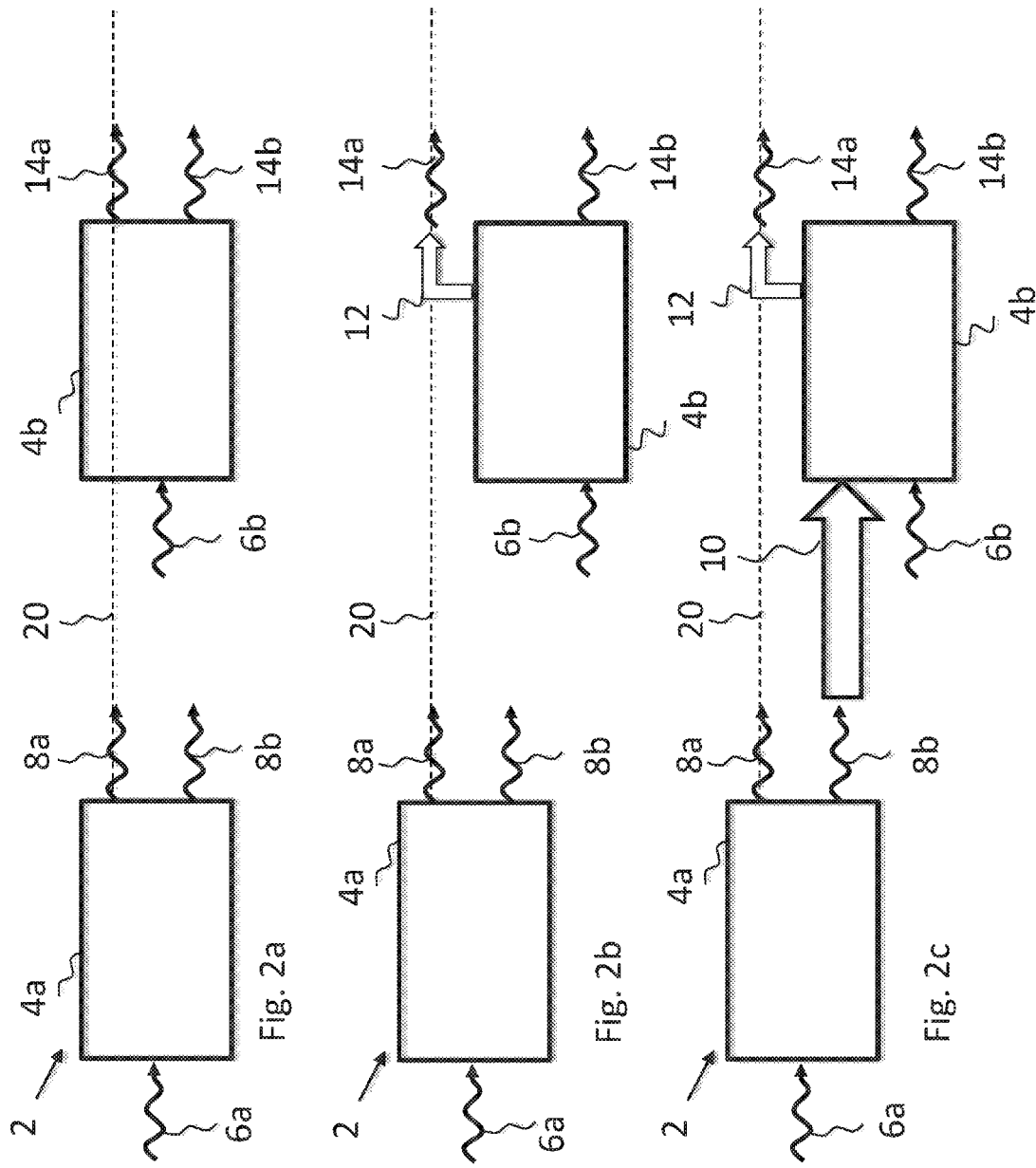

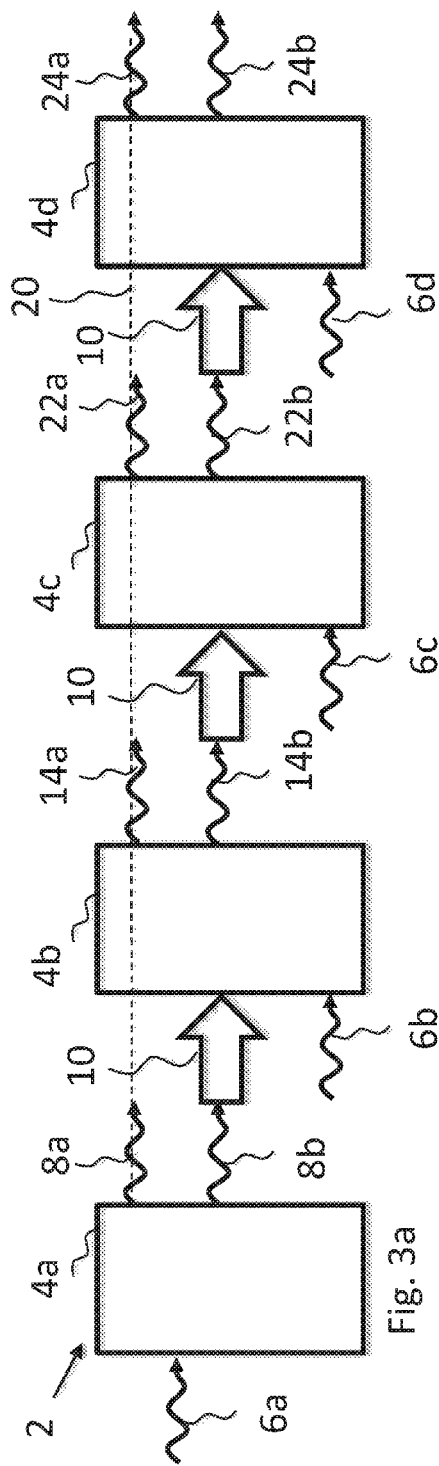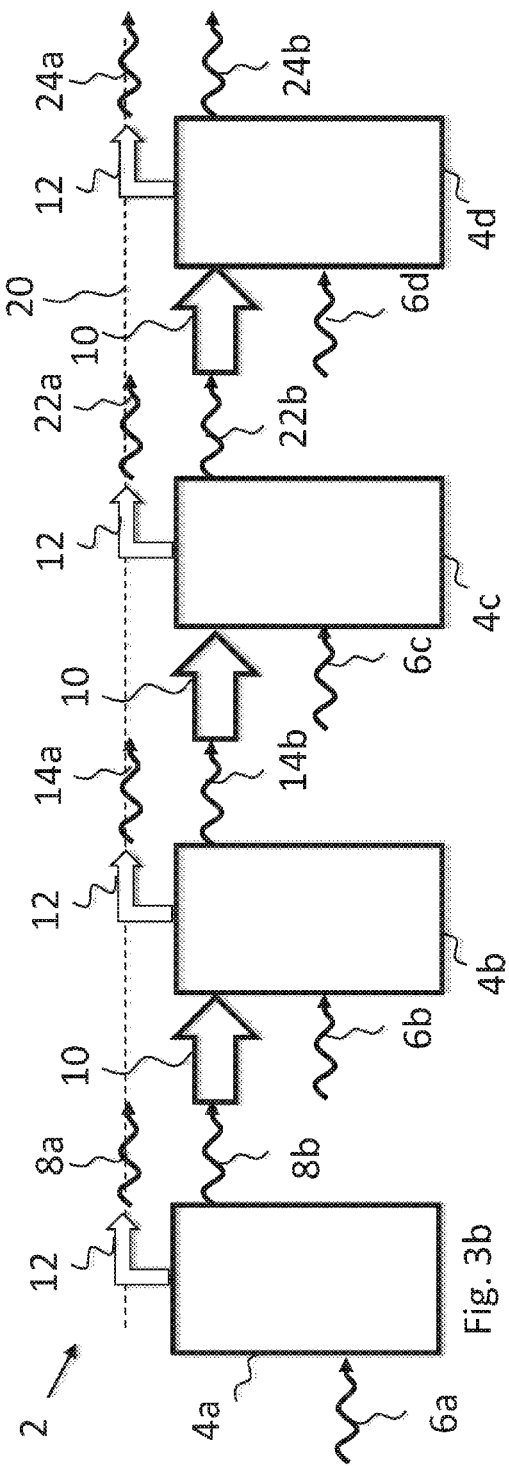

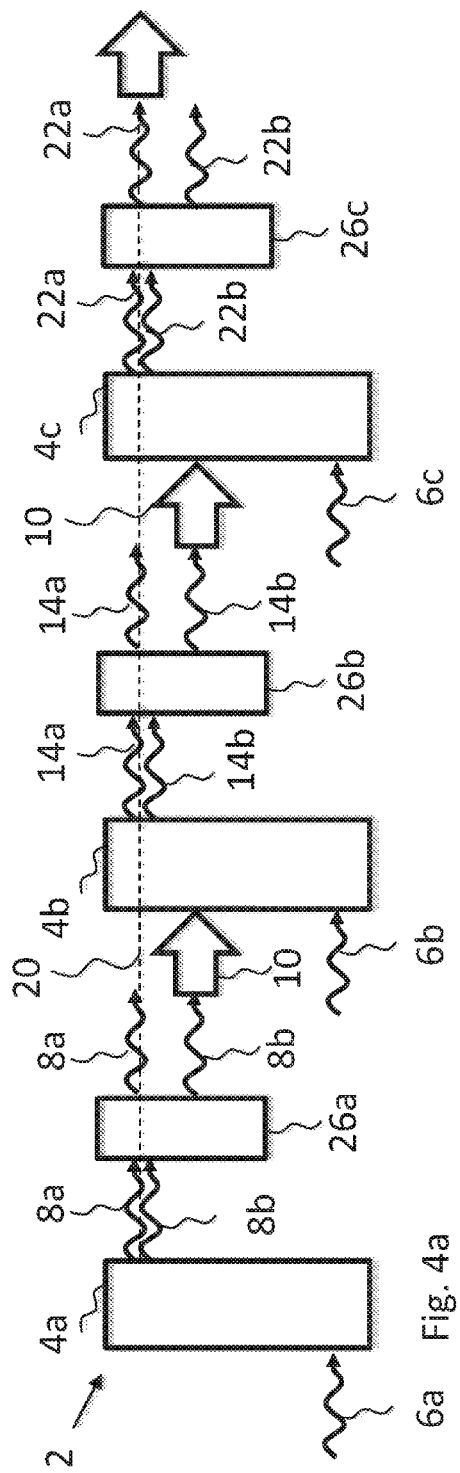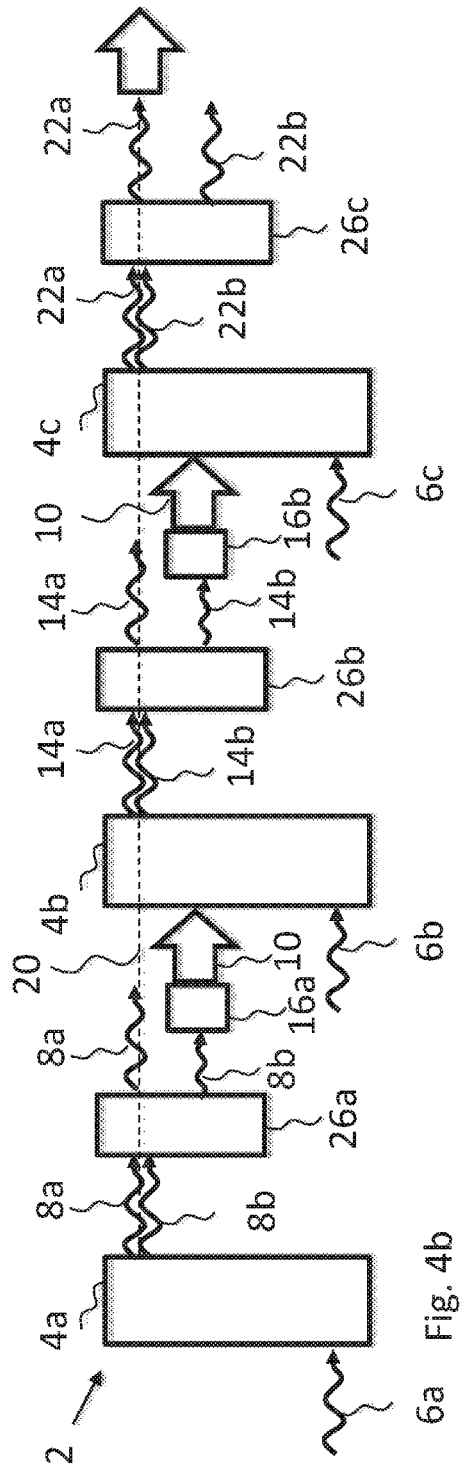

OPTICAL APPARATUS AND METHOD FOR OUTPUTTING ONE OR MORE PHOTONS

CROSS-REFERENCE TO RELATED APPLICATION

This claims priority to United Kingdom Patent Application No. 1516131.8, titled "OPTICAL APPARATUS AND METHOD FOR OUTPUTTING ONE OR MORE PHOTONS" and filed Sep. 11, 2015, which is incorporated herein by reference in its entirety.

FIELD OF THE INVENTION

The present invention is in the field of optical apparatus and associated method for outputting one or more photons, particularly optical apparatus for use as optical sources for generating on demand single photons.

BACKGROUND

The development of an on-demand single photon source has been described as desirable for many applications including quantum computing as well as other fields of science and technology. Different technologies have been proposed to generate on-demand single photons including schemes using spontaneous four wave mixing (SFWM) and spontaneous parametric down-conversion (SPDC). Both of these processes generate a pair of correlated photons using a nonlinear medium, such as a crystal pumped by a laser. Sources using SPDC and SFWM are often called heralded single photon sources because the detection of one photon indicates, or 'heralds', the presence of its twin.

Several documents discuss the generation of single photons including the following.

Journal document "Tailoring single-photon and multiphoton probabilities of a single-photon on-demand source" by Migdall et al. [Phys. Rev A, 66, 053805 (2002)] describes using an array of down-converters and detectors pumped simultaneously by the same laser. The laser power is chosen so that each down-converter has some small probability of producing a photon pair, while the number of down-converters is chosen so that there is a high likelihood of at least one pair being created somewhere in the array. The detector associated with each down-converter allows the determination of which of the down-converters has fired. This information is used to control an optical switching circuit directing the other photon of the pair onto a single-output channel. The conversion process of each down converter in the array is independent of the conversion process in the other down converters.

Journal article "Experimental generation of single photons via active multiplexing", Ma et al, [Phys. Rev A 83, 043814 (2011)] describes 'm' SPDC sources pumped by a single pulsed laser. The SPDC sources are coupled by fast photon routers and directed to a single output. The conversion process of each SPDC source in the array is independent of the conversion process in the other SPDC sources.

Journal article "Efficient generation of single and entangled photons on a silicon photonic integrated chip" by Mower et al. [Phys. Rev A 84 052326 (2011)] describes a scheme to integrate a source of highly indistinguishable photons on a silicon-on-insulator photonic integrated circuit by using actively multiplexed parametric photon (AMPP) generation. The AMPP source uses photon pairs generated by a single SPDC element pumped at some period T. A pulsed laser at 780 nm is split into a series of delays of lengths of 4T, 2T, and T, to create an eight-pulse train that then pumps a nonlinear crystal cut for type-II SPDC. The idler photons of each subsequently generated pair are sent to the "heralding decision block," which consists of a single-photon detector, data processor, bit generator and decision switch-on chip. The detector, gated by the pump laser, sends time-tagged idler arrival events to the data processor. The processor outputs to a bit generator, which modulates the decision switch-on chip, selecting which signal photon will enter the "variable delay circuit" block. A single SPDC element is used to generate the photon pairs in this document whereby the generation of one photon pair is not used to influence the generation of a further photon pair from the same SPDC source.

Journal article "Integrated spatial multiplexing of heralded single-photon sources" by Collins et al. [Nature Communications 4, 2582 (2013)] describes an experimental demonstration of integrated, spatially multiplexed, heralded single-photon sources. Pump pulses are coupled to a silicon waveguide and split to a bank of N nominally identical and monolithically integrated photonic crystal waveguides where photon pairs are generated by SFWM which are in turn routed to an N×2 optical switch to produce a sub-Poissonian heralded single photon output. The conversion process of each SFWM source in the array is independent of the conversion process in the other SFWM sources.

These photon sources use a plurality of heralding events in one or more photon pair sources to generate a photon pair used as the source output, wherein the sources allow for each event to occur and then use post event means and techniques to select one photon as the output, for example by using an optical switch. Optical switches can be a major source of loss in an optical circuit.

Journal article "Deterministic generation of single photons via multiplexing repetitive parametric down-conversions" by Glebov, B. L. et al, [Applied Physics Letters 103, 031115 (2013)] describes multiplexing two repetitive SPDC processes, wherein in each process is undertaken by two separate modules. Each process is configured to possibly generate a pair of daughter photons in modes 'a' and 'b'. A cavity is implemented in mode a so that mode a photons circulate inside the cavity whilst the number of photons generated in mode b is detected by a photon-number resolving detector. When one photon is detected in mode b of a process, pumping of that process is stopped. The conversion process of each SPDC process is independent of the conversion process in the other SPDC process.

Journal article "Photon-number state on-demand source by cavity parametric down-conversion" by Hayat et al., [Applied Physics Letters 89, 171108 (2006)] describes an SPDC based photon-number state on-demand source wherein the signal and idler photons are generated inside a monolithic single cavity. The signal photons are automatically coupled to storage. The pump pulse intensity is adjusted to produce on average 'n' SPDC pairs. The idler photons are detected wherein if the number of idler photons counted equals 'n' then an output mirror of the cavity is abruptly spoiled, reducing the Q factor and enabling the emission of the n signal photons. Only a single monolithic cavity is used, therefore SPDC conversion process of one SPDC source is not used to control the conversion process of a second SPDC source.

Journal article "On-demand single photon emission based on dynamic photon storage on a photonic integrated circuit" by Heuck et al., [Conference on Laser and Electro Optics, Munich, 2015] describes generating signal and idler photons by degenerate Four Wave Mixing in a storage ring. Three other rings are used to couple frequencies $\omega_p$, $\omega_s$, $\omega_i$ (corresponding to pump, signal and idler light frequencies respectively). A generated idler photon is coupled to a detector via the idler ring, which in turn triggers a switch to stop the pump laser from entering the pump ring. The signal photon is kept in the storage ring until a clock signal arrives at the signal ring causing it to temporarily tune into resonance with $\omega_s$ to release the signal photon. This scheme has a single 'storage ring' used to generate the signal and idler photons and uses a separate tunable 'signal' ring to couple out the signal photon from the storage ring. The conversion process of photon pairs in the ring is not used to control the conversion process in the other photon pair sources.

SUMMARY

According to a first aspect of the present invention there is provided an optical apparatus comprising: a first photon pair source configured to convert at least one pump light photon into a first correlated signal and idler photon pair; a second photon pair source configured to convert at least one further pump light photon into a second correlated signal and idler photon pair; the apparatus is configured to use one of the signal and idler photons from the first correlated photon pair for controlling the conversion of the said at least one further pump light photon.

The first aspect may be modified in any suitable way as disclosed herein including but not limited to any one or more of the following.

The apparatus may be configured such that, at least one of the signal and idler photons from the first correlated photon pair is output from the first photon pair source onto an optical path; at least one of the signal and idler photons from the second correlated photon pair is output from the second photon pair source onto the said optical path.

The apparatus may be configured such that at least part of the second photon pair source is disposed along the optical path.

The apparatus may be configured such that the second photon pair source is separated from and optically coupled to the optical path.

The apparatus may be configured such that the control of the conversion of the said at least one further pump light photon comprises a change in the photon pair conversion processes occurring within the second photon pair source; the said change being synchronised with the arrival, at the second photon pair source, of the at least one of the signal and idler photons from the first correlated photon pair along the optical path.

The apparatus may be configured to input pump light output from the first photon pair source into the second photon pair source.

The apparatus may comprise an optical detector, wherein: the apparatus is configured to detect, using the optical detector, the said one photon from the first correlated photon pair; the apparatus is configured, upon the optical detector detecting the said one photon, to generate an electrical signal for controlling the conversion of the said at least one further pump light photon.

The apparatus may be configured to use the electrical signal to temporarily change an optical property of the second photon pair source affecting the conversion of the said at least one further pump light photon.

The apparatus may comprise a pump light controlling device configured to receive the electrical signal and change the amount of pump light input to the second photon pair source.

The apparatus may comprise an optical filter device for spatially separating the said one of the signal and idler photons from the first correlated photon pair.

The apparatus may be configured to: direct one of the signal and idler photons from the first correlated photon pair from the filter to the detector; direct the other of the signal and idler photons from the first correlated photon pair along the optical path; the optical path configured to: optically couple with the second photon pair source about a coupling region; direct the said other of the signal and idler photons towards the coupling region.

The apparatus may be configured such that at least one of the first and second photon pair sources comprises an integrated optic waveguide.

The apparatus may be configured such that at least one of the first and second photon pair sources comprises a circulating optical resonator.

According to a second aspect of the present invention, there is provided a method for outputting one or more photons using the apparatus as described in the first aspect, the method comprising the steps of: receiving pump light at the first photon pair source; the pump light comprising the said at least one pump light photon; converting the said at least one pump light photon into a first correlated signal and idler photon pair; using one of the signal and idler photons from the first correlated photon pair for controlling the conversion of the said at least one further pump light photon in the second photon pair source.

The second aspect may be modified in any suitable way as disclosed herein including but not limited to any one or more of the following.

The method may be configured such that the step of using one of the signal and idler photons from the first correlated photon pair comprises stopping the conversion of the said at least one further pump light photon in the second photon pair source.

According to a third aspect of the present invention there is provided an optical apparatus comprising: a first photon pair source configured to convert at least one pump light photon into a first correlated signal and idler photon pair; a second photon pair source configured to convert at least one further pump light photon into a second correlated signal and idler photon pair; wherein the apparatus is configured such that, at least one of the signal and idler photons from the first correlated photon pair is output from the first photon pair source onto an optical path; at least one of the signal and idler photons from the second correlated photon pair is output from the second photon pair source onto the optical path.

The third aspect may be modified in any suitable way as disclosed herein including but not limited to any one or more of the optional features/configurations described for the first aspect and any of the following.

The apparatus may be configured to use one of the signal and idler photons from the first correlated photon pair for controlling the conversion of the said at least one further pump light photon.

BRIEF DESCRIPTION OF THE DRAWINGS

Embodiments of the present invention will now be described in detail with reference to the accompanying drawings, in which:

FIGS. 1a-1c illustrate examples of optical apparatus described herein comprising two photon pair sources;

FIGS. 2a-c illustrate examples of optical apparatus described herein comprising two photon pair sources optically coupled to a common optical path;

FIGS. 3a-b illustrate examples of optical apparatus described herein comprising four photon pair sources optically coupled to a common optical path;

FIGS. 4a-b illustrate examples of optical apparatus described herein comprising three photon pair sources optically coupled to a common optical path;

DETAILED DESCRIPTION

Figure 5:
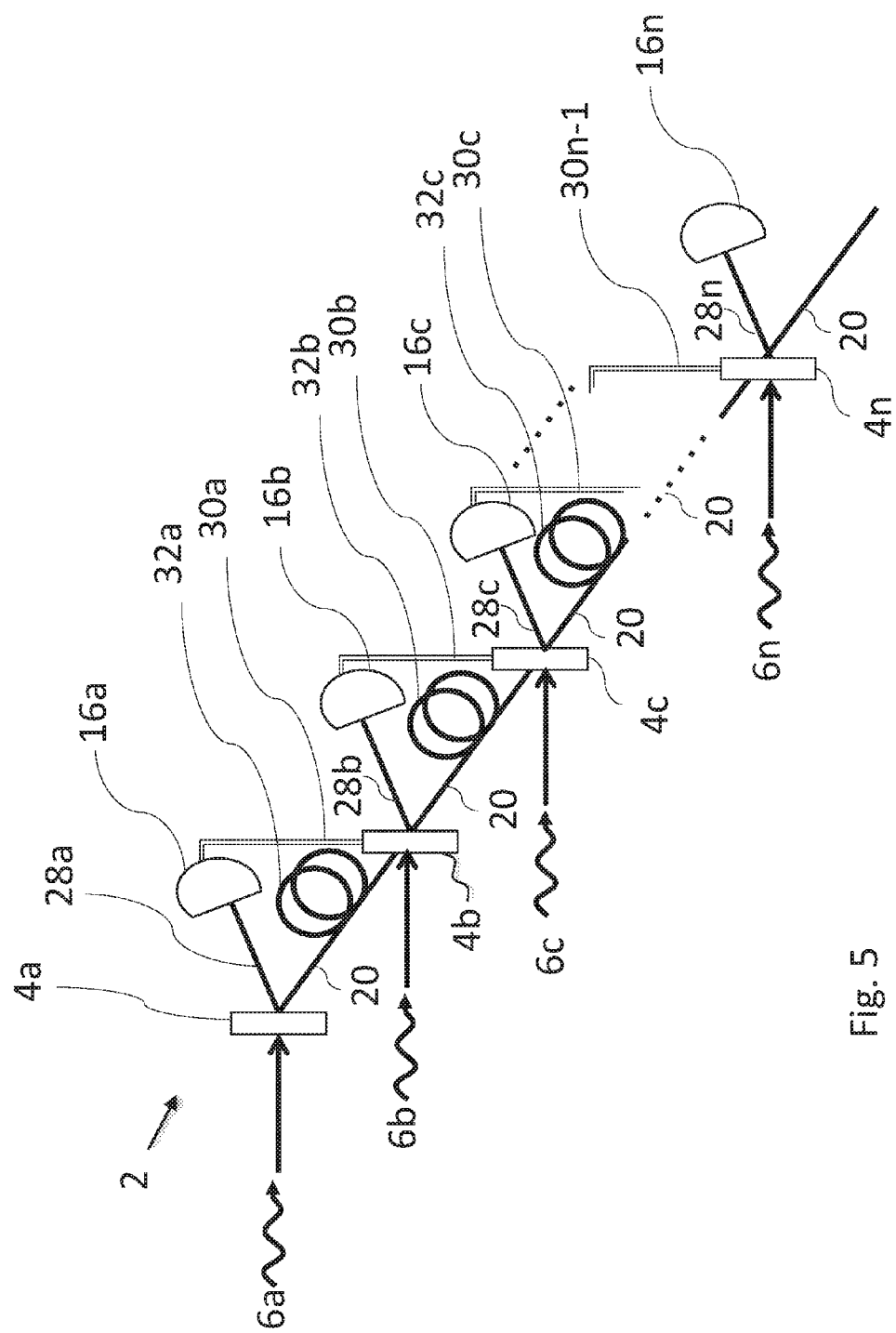
FIG. 5 illustrates an example of an optical apparatus described herein and configured to use a photon from a photon pair to control the conversion of photon pairs in other photon pair sources.

There is presented an optical apparatus 2 for generating photons. FIG. 1a shows an example of such an apparatus 2. The apparatus 2 comprises a first photon pair source 4a configured to convert at least one pump light photon 6a into a first correlated signal and idler photon pair 8. The apparatus further comprises a second photon pair source 4b configured to convert at least one further pump light photon 6b into a second correlated signal and idler photon pair 14. The apparatus 2 is configured to use one of the signal and idler photons from the first correlated photon pair 8 for controlling the conversion of the said at least one further pump light photon.

Figure 12:
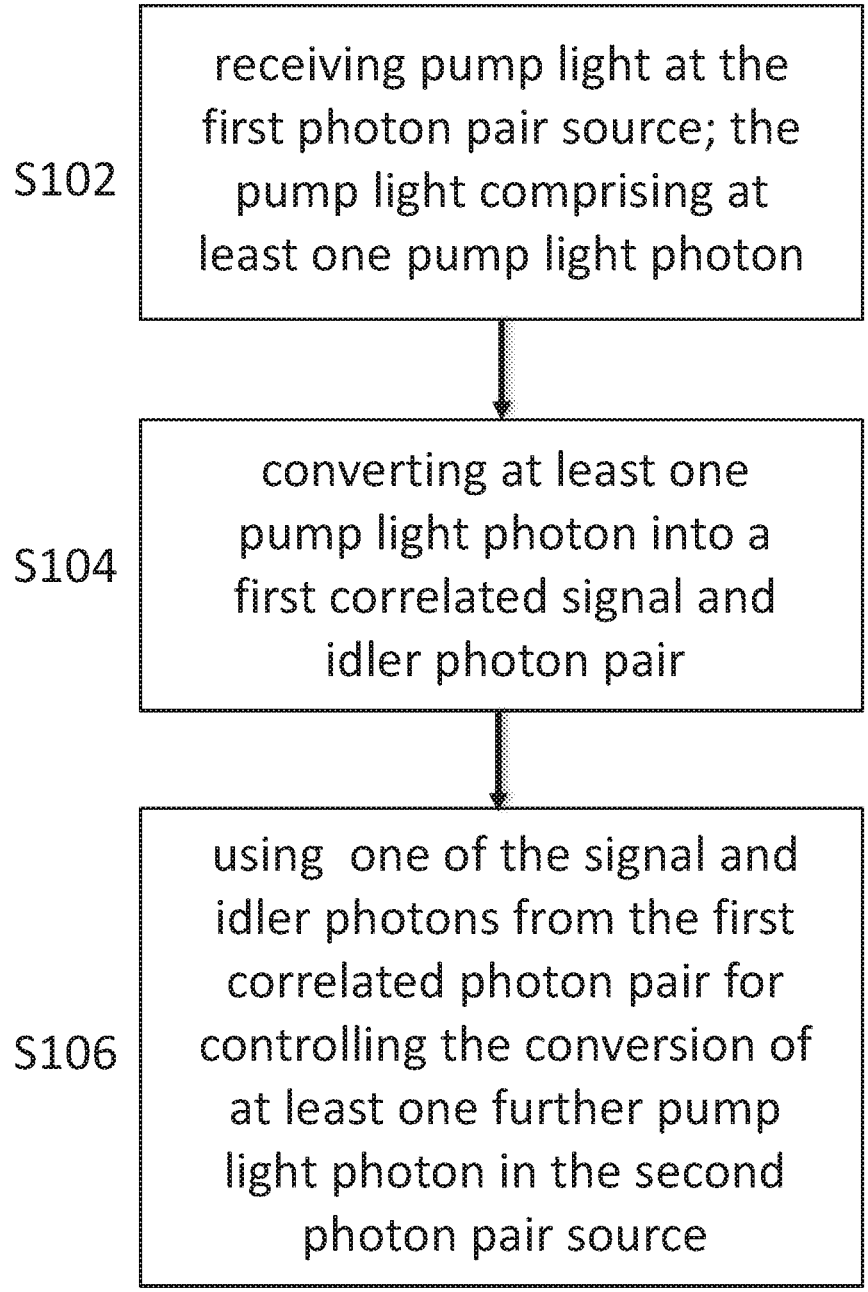
FIG. 12 illustrates a block diagram of an example method described herein.

There is also presented a method for outputting one or more photons using the apparatus 2 described above and elsewhere herein. An example of this method is shown in FIG. 12 and comprises the steps of: receiving S102 pump light at the first photon pair source; the pump light comprising the said at least one pump light photon; converting S104 the said at least one pump light photon into a first correlated signal and idler photon pair; using S106 one of the signal and idler photons from the first correlated photon pair for controlling the conversion of the said at least one further pump light photon in the second photon pair source.

The optical apparatus 2 can therefore be used as an optical source with a plurality of photon pair sources 4a-n where the successful creation and emission of one photon pair 8 from one photon pair source 4a can be used to alter the output of photon pairs 14 from another photon pair source 4b by controlling 12 the other photon pair source's ability to convert pump light photon/s. The arrow with the reference '10' is used in FIGS. 1, 1a, 1b, 2C, 3a, 3b, 4a, 4b to denote some form of control being imparted upon the conversion process of a further photon pair source as a result of the emission of the photon pair in a previous source. FIG. 1a shows an example of this control 10 with two photon pair sources 4a/4b. One example of altering the conversion process in the second source 4b is to reduce the likelihood of the second photon pair source 4b creating a photon pair 14. This may be accomplished in one or more ways including, for example, decreasing the pump light intensity entering the second photon pair source 4b (or even removing input pump light entirely) and/or altering a property of the second photon pair source 4b that leads to inefficient photon pair generation. Other types of conversion process control may also be used.

Example of Operation

An apparatus 2 may be used as an on-demand single photon source where the successful creation of a photon pair 8 in the first source 4a is used to prevent the generation of other photon pairs (for example photon pair 14 from photon pair source 4b) in one or more other sources 4b-4n. One of the signal 8a or idler 8b photons generated by the first source 4a is used for controlling the photon pair conversion in one or more other sources 4b-4n whilst the other of the signal 8a and idler 8b photons in the pair 8 is output by the photon pair source 4a along an optical path for outputting from the apparatus 2. In such a configuration the apparatus 2 only outputs a single photon because the generation of photon pairs from other photon pair sources, for example photon pair source 4b is suppressed.

The photon used to control a further photon pair source may be termed throughout as the 'control photon', where the other photon of the pair may be termed throughout as the 'sister photon'. These terms are used to merely aid the description of the apparatus 2. FIG. 1a shows the idler photon 8b from the photon pair 8 being used as the control photon to control the second source 4b, however either the signal photon 8a or idler photon 8b may be used.

In one example, the apparatus 2 is configured to allow each photon pair source 4a-n to convert one or more pump light photons 6a-n into a photon pair, i.e. the apparatus 2 is configured to provide pump photons 6a-n to the photon pair source 4a-n and the source is configured in a state to generate photon pairs at the desired wavelength/with the desired photon properties. The process for converting pump photons 6a-n into photon pairs is non-deterministic; however certain factors may influence the conversion process such as the availability of pump photons 6a-n and the physical properties or configurations of the photon pair source. Therefore controlling one or more of these factors controls the conversion process.

If the first source 4a does not output a photon pair 8 then there is no control photon available to control the photon pair conversion process in second source 4b and optionally other further sources 4c-4n. Therefore the second source 4b may output a photon pair 14 as normal. The apparatus is configured such that when one photon pair source 4, for example the source 4a shown in FIG. 1a, outputs a photon pair 8 one of the signal 8a or idler 8b photons is the control photon and is directed and/or otherwise used to control the second source 4b, whilst the other photon of the pair (the sister photon) is directed to an output path of the apparatus 2.

The directing or 'tapping off' of the control photon may be achieved using any suitable method or configuration of features, for example: being split from its sister photon by means of a wavelength filter if the control and sister photons have different wavelengths; being directed along a spatially separate optical output path from the source by virtue of the properties of the photon source generating the pair (for example each of the photons of the pair having a different k-vector upon being output from a crystal photon pair source).

The apparatus 2 in this example is configured to only output (for transmission) one signal or idler photon from any of the one or more photon pair sources 4a, 4b. This system of using a control photon from one photon pair 8 to control photon pair generation in one or more other photon pair sources 4b may use a series of two or more concatenated photon pair sources '4a-n', optically linked in series, that form an on demand single photon source. Examples of this are described in this application.

In other examples, the conversion of photon pairs in the second photon pair source 4b may be controlled in any other suitable manner including increasing the likelihood of the second photon pair source 4b emitting photon pairs. Such control may be required in applications where an 'n' number of output photons may be required. In another example, the control of the conversion may be used to control the optical properties of photon pairs generated further in the photon pair source 4b-4n, for example tuning a further photon pair source 4b-n to output signal and idler photons with particular wavelengths.

Controlling the Conversion

The control photon from the first photon pair source 4a may be used control the conversion in any suitable way including being detected by an optical detector 16 (also referred to as photon detector) as shown in FIGS. 1b and 1c wherein the resulting electrical signal from the optical detector 16 can either be used as an input to directly control the second source 4b or may be used as an input into another device, component or controller device 18 used to control the conversion process. Examples of control devices 18 may be pump laser power sources and/or pump laser beam attenuation devices/light modulators or other actuators. The electrical signal output from the detector 16 may be used to directly control the conversion process or it may be input into other electronic circuitry, for example an OP-AMP that is configured to output a suitable electronic signal for controlling the device, component or feature that is used to control the conversion process.

Alternatively, the photon used to control the conversion process in the second source 4b may be used to optically switch/control one or more further components or devices used to control the conversion. For example the photon may be optically amplified or otherwise used to generate a larger light signal intensity used to optically switch on or off pump laser light.

There is further presented an optical apparatus 2 for generating photons. An example of such an apparatus 2 is shown in FIG. 2a. The apparatus 2 comprises a first photon pair source 4a configured to convert at least one pump light photon 6a into a first correlated signal and idler photon pair 8a/b. The apparatus 2 also comprises a second photon pair source 4b configured to convert at least one further pump light photon 6b into a second correlated signal and idler photon pair 14a/14b. The apparatus 2 is configured to output at least one of the signal and idler photons 8a/8b (from the first correlated photon pair) from the first photon pair source 4a onto an optical path 20. Furthermore, the apparatus 2 is configured to output at least one of the signal and idler photons 14a/14b (from the second correlated photon pair) from the second photon pair source 4b onto the optical path 20.

The apparatus 2 in this example is therefore configured such that at least one of the photons 8a/8b from a first photon pair 8 (created with a first photon pair source 4a) occupies the same spatial mode as the spatial mode encountered by at least one of the photons 14a/14b from a second photon pair 14 (created with a second photon pair source 4b) when that said second photon 14a/14b is coupled out of the second photon pair source 4b.

Preferably, the apparatus 2 is configured such that the generation of at least one of the photons 8a/8b of a photon pair 8 from a first photon pair source 4a is synchronised in time to occupy substantially the same spatial and temporal optical mode as the spatial and temporal optical mode occupied by at least one of the photons 14a/14b from a second photon pair 14 (created with a second photon pair source 4b) when that said second photon pair photon 14a/14b is coupled out of the second photon pair source 4b. The photon from the second photon pair 14 will therefore occupy (at least when it is coupled out of the second photon pair source 4b) the same time bin as a photon from the second photon pair.

This synchronisation may be achieved in any suitable way that provides a synchronised trigger to provide each photon pair source with the means to create a photon pair. Synchronisation may include having synchronised pump light pulses incident upon the photon pair sources 4a-4n and/or synchronising the control of the properties of the photon pair sources 4a-n to only be able to convert pump photons into photon pairs at particular times. This synchronisation may be achieved by introducing one or more optical delays such as lengths of optical fibre, integrated waveguide or a free space bulk optic delay. Synchronisation schemes may include the following examples: having a first pump light pulse enter a first photon pair source 4a in order to create a first photon pair; having a further pump light pulse timed to enter a second photon pair source 4b and generate a second photon pair 14 that gets coupled into the same optical path at the same time the photon from the first photon pair is propagating along the same path.

In one example, as shown in FIG. 2a, at least part of the second photon pair source 4b is disposed along (and forms part of) the optical path used to output the sister photon. Therefore, the apparatus 2 is configured such that at least one of the signal or idler photons 8a/8b output from the first photon pair source 4a passes through the second photon pair source 4b.

Additionally or alternatively, any photon pair source 4a-n may be separated from (i.e. not form part of) but be optically coupled to the optical path 20 as exemplified in FIG. 2b where source 4b is adjacent to the optical path 20 and is configured to couple 12 at least the signal photon 14a onto the optical path 20. In some examples, the sources 4a-n that do not form part of the optical path 20 may couple any of the signal, idler of unconverted pump photons onto the optical path 20.

The feature of outputting photons from photon pair sources 4a-n along a common optical path 20 may be used in conjunction with the features of other examples of optical apparatus 2 described herein. For example, FIG. 2c provides an example of an apparatus 2 wherein signal photons 8a generated from the first source 4a propagate along an optical path 20 that is also used by the second photon pair source 4b to output its signal photons 14a. In FIG. 2C, the second photon pair source 4b does not form part of the common optical path 20 but optically couples 12 signal photons 14a onto the path 20. The idler photons 8b from the first photon pair source 4a are used to control the photon pair conversion process in the second photon pair source 4b.

If the sister photon of one photon pair is synchronised in time with, and follows the same spatial optical path (upon exiting its respective photon pair source) as, a sister photon generated from a previous photon pair, then the apparatus 2 may output sister photons from the photon pair sources 4a-4n in the same physical path and in the same time bin. If the apparatus is configured such that the corresponding control photons of the photon pair sources 4a-n are used to inhibit or prevent the conversion of photons from successive photon pair sources 4a-n, then the apparatus 2 may be configured to output only up to a single sister photon from the entire apparatus 2 along a particular spatial optical path and in a particular time bin, (assuming at least one of the photon pair sources 4a-n produces at least one photon pair and that photon does not get scattered or absorbed before it exits the apparatus 2).

This configuration of the apparatus 2 may be used as an on demand single photon source, several schematic examples of which are shown in FIGS. 3a, 3b, 4a and 4b.

FIG. 3a shows a schematic example of such an on demand source comprising four photon pair sources 4a-4d optically connected in series. Each photon pair source 4a-4d is pumped by a separate input of pump photons 6a-6d.

Each photon pair source 4a-4d is configured to output signal and idler photons along spatially separate optical paths wherein the optical path for the signal photon 8a output from the first photon pair source 4a forms the start of a common optical path 20 that runs through at least a portion of the further photon pair sources 4b-4d. In this example the pump light inputs 6a-6d are synchronised light pulses configured such that signal photons 8a, 14a, 22a and 24a may be output onto the same spatial and temporal mode on the common optical path 20. The apparatus 2 is configured such that each of the photon pair sources 4a-d may generate a photon pair in absence of a previous control photon being generated by a previous photon pair source 4 in the chain.

The apparatus 2 is configured to synchronise the arrival of the pump pulses 6a-d as follows:
  the receiving of the pump pulses 6a-6d by the corresponding photon pair sources 4a-4d are staggered in time so that the first pump pulse 6a is input to the first photon pair source 4a before any of the other pump pulse 6b-d are input to their corresponding photon pair sources 4b-d;
  similarly, the second pump pulse 6b is input to the second photon pair source 4b before any of the next pump pulses 6c-d are input to their corresponding photon pair sources 4c-d;
  similarly, the third pump pulse 6c is input to the third photon pair source 4c before the next pump pulse 6d is input to the photon pair source 4d;
  the arrival, at a later photon pair source, of a signal photon from a previous photon pair source in the chain, is synchronised with the arrival of the pump pulse for that later photon pair source (wherein the pump pulse may be prevented from being input to the later photon pair source via an optical or electrical control signal generated as a result of the creation of the previous idler photon).

If a photon pair 8a/8b is successfully created using one or more photons from the first pump pulse 6a, then the idler photon 8b is used to control the conversion of photon pairs 14a/14b in the next subsequent photon pair source 4b by preventing any conversion happening. This may be achieved in any suitable manner including by being detected by a photon detector 16 (not shown) and using the resulting electronic signal to do any of the following: detune the conversion process within the next photon pair source 4b by temporarily altering one or more of its physical properties affecting photon pair conversion; turning the pump laser source off; switching out or otherwise reducing the pump light levels entering the source during the synchronised time bin to a negligible intensity level. The signal photon 8b then propagates through photon pair sources 4b, 4c and 4d and is then output from the apparatus. The electrical signal generated by the detector 16 (not shown) from the creation of the idler photon 8b, is also used in this example to control the photon pair conversion process in the other photon pair sources 4c and 4d in a similar fashion to photon pair source 4b. By doing this, the only signal photon that gets generated and output by the apparatus in a particular time bin (in this scenario) is the signal photon 8a generated by the first photon pair source 4a.

Similar to the control that the first idler photon 8b (when detected) has on the further photon pair sources 4b-n, each of the photon pair sources 6b and 6c are also able to control the conversion process of each further photon pair source 4 further along the chain.

Therefore, if the first photon pair source 4a does not successfully convert pump photons 6a into a photon pair 8a/8b then the absence of a control photon generated from photon pair source 4a, hence absence of control signal, allows the next photon pair source to convert pump photons from pump pulse 6b into a signal and idler photon pair 14a/14b. If a photon pair 14a/14b does get generated then, similarly to the generation of a photon pair 8a/8b in the first photon pair source 4a, the idler photon 14b is use to control (i.e. turn off) the photon pair conversion process in the further photon pair sources 6c and 6d for that particular time bin. This process continues, for each photon pair source, all the way along the chain.

FIG. 3b shows a similar arrangement to FIG. 3a except that the photon pair sources 4a-4d do not form part of the common optical path 20 for the signal photons 8a, 14a, 22a, 24a. Instead, the said sources 4a-4d are configured to be able to optically couple 12 at least the signal photons 8a, 14a, 22a, 24a onto the common optical path 20. The photon pair sources 4a-4d may also couple any of the unconverted pump 6a-6d and idler 8b, 14b, 22b, 24b, 22b, 24b photons onto the path 20.

FIG. 4a shows a similar example as shown in FIG. 3a, but with only three photon pair sources 4a-4c wherein the apparatus 2 is configured to couple both the signal and idler photons from each pair onto the common optical path 20. After coupling the said photon pair onto the path, a filter 26a-c is used to spatially separate the signal and idler photons (and optionally any unconverted pump photons 6a-c) so that the signal photons may propagate down the common path 20 whilst the idler photons get directed for use in controlling the further photon pair sources along the chain.

FIG. 4b shows a similar example to that shown in FIG. 4a wherein the apparatus 2 is configured to direct the idler photon to a photon detector 16a-b corresponding to the photon pair source from which the photon was generated. The corresponding electronic signal from the photon detector is then used for controlling at least the next photon pair conversion process in the next photon pair source 4. In some examples, this electronic signal is used to control the photon pair conversion process in all of the further photon pair sources in the chain.

Any of the examples of the apparatus 2 described herein may be adapted or modified according to any suitable features, components or configurations in other examples, including any of the following.

Apparatus

The apparatus 2 may be formed using any number of components/devices or types of component devices. For example, the apparatus 2 may be formed from bulk optical components. Additionally or alternatively, the apparatus 2 may be formed using fibre optic components and/or integrated optic components.

The apparatus 2 may be configured to direct the photons used in the apparatus 2 between different components (such as, but not limited to: source 15 of pump photons 6a-n, the photon pair sources 4a-n, detectors 16) using any suitable optical arrangement including any one or more of: arranging the component to direct photons via free space propagation, use of lenses, mirrors and other focussing or photon path directing components, waveguiding components such as optical fibres and integrated waveguides.

Photon Pair Sources

The photon pair sources 4a-n may be any type photon pair source 4a-n that generates a signal and idler photon pair. Different types of photon pair source may be used for each separate source 4a-n within the apparatus 2 although it is preferred that the photon pair sources 4a-n within the same apparatus 2 are similar or identical in structure.

The apparatus may comprise two or more photon pair sources 4a-n, preferably between $N_0-1$ and $N_0+1$.

$$N_0 = \text{round}\left[\frac{\ln\left(\frac{\ln(p_{vac})}{\ln(\eta)}\right)}{\ln\left(\frac{\eta}{p_{vac}}\right)}\right] \quad [1]$$

We describe below an example of how to compute the relevant metrics of the apparatus where:

$\eta_{control}$ is the optical transmission in the control arm and includes filtering, propagation, detection efficiencies and any other possible phenomenon affecting the optical transmission; and, $\eta$ is the optical transmission in one stage of the apparatus including filtering, propagation and any other possible phenomenon affecting the optical transmission.

The probability for a photon pair to be produced in a given stage per clock cycle (or equivalently per input pulse) is $P_{single\ pair} = \chi(1-\chi)$ where $\chi = \tanh(\beta E)$ is related to the pulse energy E and the effective non-linear conversion efficiency (material and geometry dependant) $\beta$. The probability to have multiple pairs to be emitted is defined as $P_{multi\ pair} = \chi^2$. The probability to measure no photons, accounting for the transmission in the control arm is defined as $p_{vac}$. The probability to have a single photon to be emitted from the full apparatus (comprising all the stages) is given by $P_{single}$. The probability for the full apparatus to raise a valid trigger (i.e. detecting one and only one photon in the control arm) has been emitted is called $P_{trig\ single}$. The probability for the full apparatus to raise an invalid trigger when multiple photons are being detected is $P_{trig\ multi}$. In this case, the output state may have to be discarded. Finally, the heralding efficiency 'h' is the probability to emit a single photon from the apparatus, knowing that a valid trigger has been raised.

$$P_{single\ pair} = \chi(1-\chi) \quad [1a]$$

$$P_{multi\ pair} = \chi^2 \quad [1b]$$

$$\chi = \tanh(\beta E) \quad [1c]$$

$$P_{vac} = \frac{1-\chi}{1-\chi(1-\eta control)} \quad [1d]$$

$$P_{single} = P_{pair}\eta^N \frac{\left(1-\left(\frac{P_{vac}}{\eta}\right)^N\right)}{1-\frac{P_{vac}}{\eta}} \quad [1e]$$

$$P_{trig\ single} = P_{single\ pair}\frac{1-P_{vac}^N}{1-P_{vac}} \quad [1f]$$

$$P_{trig\ multi} = P_{multi\ pair}\frac{1-P_{vac}^N}{1-P_{vac}} \quad [1g]$$

$$h = \frac{P_{single}}{P_{trig\ single}} \quad [1h]$$

The photon pair sources 4a-n may generate the photons using any mechanism including but not limited to any of a $\chi^2$ nonlinear optical process such as SPDC or a $\chi^3$ nonlinear optical process such as FWM. In some examples, the signal and idler photon pairs are non-degenerate by virtue of the signal wavelength being different from the idler wavelength. In one example the source 4a-n is a non-linear phase matched crystal. Preferably this crystal is periodically poled. The photon pair source 4a-4n may be a periodically poled material such as periodically poled potassium titanyl phosphate crystal (PPKTP).

If the primary nonlinear process to generate photon pairs is FWM, then the photon pair source 4a-n may comprise an integrated optic waveguide comprising a core material suitable for generating photon pairs via SFWM, for example a rectangular silicon core waveguide 70 on a silica undercladding 72 (also known as silicon on insulator) as exemplified in figure ii. The silica under-cladding 72 may be grown, deposited or otherwise formed on a substrate such as a silicon substrate 74. The core waveguide 70 may be surrounded by further material layers such as being bordered on the top surface by a silica overcladding 76. Figure ii shows an example of a rib waveguide wherein the side edges of the core 70, undercladding 72 overcladding 76 are air bordered and wherein part of the silicon substrate 74 has been removed (for example being etched) so that a portion of the substrate 74 forms part of the mesa structure comprising the silicon core. In principle, any integrated optic material system and/or cross sectional structure could be used with a core being a photon pair source 4a-n.

In examples using integrated optic waveguides, a circulating optical resonator structure may be used as the photon pair source 4a-4d, for example a ring resonator as described below. Additionally or alternatively a serpentine waveguide circuit may be used as the photon pair source 4a-n. Preferably waveguide photon pair sources 4a-n comprise the same waveguide cross section and materials used elsewhere in the apparatus 2, so that insertion losses between waveguiding components is reduced and manufacturing complexity is minimised. When using a continuous length of waveguide as a photon pair source as described above the source waveguide length, Lc, is preferably 0.1 mm<Lc<4 cm; more preferably 1 mm<Lc<2 cm, also given a waveguide loss in the source section in dB/cm $\alpha_{dB}$, $$Lc < \frac{10}{\alpha_{dB}\ln 10} \qquad [2]$$

In one example using an SPDC photon pair source the photon pair source 6 is preferably configured to generate, (within the source), signal photons having a wavelength within a first range of signal wavelengths and idler photons having a wavelength within a first range of idler wavelengths. However the photon pair source is configured to: output signal photons having a wavelength within a second range of signal wavelengths that is narrower than the first range of signal wavelengths; and output idler photons having a wavelength within a second range of idler wavelengths that is narrower than the first range of idler wavelengths. This may be accomplished using any suitable means including phase matching.

In some examples, the photon pair may be degenerated by having their wavelengths identical. In such examples, the signal and idler photons may be differentiated (and hence separated) by their respective polarisations. For example, the signal photon is TE polarised whilst the idler photon is TM polarised and a polarisation splitter is used to direct one photon to a detector (as a control pulse) whilst the sister photon is directed towards the apparatus output.

When phase matching the photon pair source 4, any type of phase matching may be used including but not limited to: type O phase matching where the pump photons, signal and idler photons all have the same polarisation, type I phase matching where both the signal and idler photons have an orthogonal polarisation to the pump photons and type II where the pump and idler photons have the same polarisation whilst the signal photons are orthogonal to the pump photons.

If the signal and idler photons of the same pair have the same polarisation then the apparatus 2 needs to separate them using another photon optical property such as wavelength, for example using a wavelength filter. For example, if a type I phase matched photon pair source 6 was used, then the apparatus 2 could use a dichroic mirror to separate the photons of the photon pair.

The photon pair source 6 may be configured to output the photon pair collinearly (i.e. along the same output path) or non-collinearly (i.e. output with divergent optical paths). If the photon pair source 6 is non-collinear then the requirement for a separate component to separate the signal and idler photons may be negated.

The photon pair sources 4, in some examples, may comprise optical fibre. For this type of photon pair source the pump wavelength $\lambda p$ is preferably: 0.41 μm<$\lambda p$<2.2 μm; and the idler wavelength $\lambda i$ is preferably 0.6 um<$\lambda i$<2.4 um.

Ring Resonator Photon Pair Sources

Ring resonators support resonant optical modes or particular wavelengths according to the specific design of the optical cavity.

The wavelength resonant spacing $\Delta\lambda$ of a single ring resonator coupled to an adjacent integrated waveguide (also known as a bus guide) can be shown to be given by the following equation:

$$\Delta\lambda = -\left(\frac{\lambda^2}{NL}\right) \qquad [3]$$

Where N is the group index of the mode in the ring and L is the ring resonator length. The 'transmission' for such a system (of ring coupled to bus) refers to the light which continually propagates along the bus guide after the ring resonator, i.e. the combination of the light not coupled into the ring from the bus guide together with the light coupled back out of the ring into the bus guide. Which wavelengths of light actually continue to propagate along the bus guide is determined by the ring and ring/bus guide coupling design as follows.

It can be shown that for a single ring resonator coupled to a straight 'bus' guide, the intensity transmittance of the optical ring resonator, as a function of wavelength is:

$$T(\phi) = (1-\gamma)\left[1-\left(\frac{(1-x^2)(1-y^2)}{(1-xy)^2 + 4xy\sin^2(\phi/2)}\right)\right] \qquad [4]$$

Where:

$$x = (1-\gamma)^{\frac{1}{2}}\exp\left(-\frac{\rho}{2}L\right) \qquad [5]$$

$$y = \cos(\kappa \iota) \qquad [6]$$

$$\phi = \beta L = \frac{2\pi}{\lambda}L \qquad [7]$$

Where κ is the mode coupling coefficient determined primarily by the bus and ring cross sections and their proximity to each other, τ, is the coupling length of the ring and bus guide, γ is the intensity insertion loss coefficient (i.e. the inherent loss associated with presence of the ring perturbing the optical mode in the bus guide), ρ is the intensity attenuation coefficient of the mode propagating around the ring, β is the propagation constant of the mode.

Therefore a ring resonator can theoretically be designed such that for particular wavelengths, light is coupled into the ring and destructively interfered on its exit with coherent light propagating along the same bus guide so that no optical modes at that wavelength are propagated further down the bus guide beyond the coupling point of the ring resonator.

The photon pair source ring can therefore be designed so that pump light is coupled into the ring and allowed to propagate/circulate to increase the likelihood of a photon pair to be generated from each successive pass of photons around the ring. This requires that the pump light is coherent and that the ring has resonances at the wavelength of the pump light. Preferably the pump light is monochromatic coherent light, for example laser light, so that substantially all the pump light forms resonant optical modes in the ring. More preferably the pump photons are a pulse of light.

Coupling the pump light into the ring allows the intensity of pump light in the ring waveguide to be greater than that of the bus waveguide, hence increasing the probability of photon pair generation. Photon pairs are only generated within the ring at the resonant wavelengths supported by the ring. When a photon pair is generated, we do not know where in the ring they are generated. Furthermore each photon of the photon pair has a probability amplitude (dictated by its wavefunction) of a particular length. Both of these effects entail that signal and idler photons only get generated when each photons wavefunction constructively interferes with itself in the ring.

When using a $\chi^3$ nonlinear optical process such as FWM in a silicon waveguide, two pump photons get annihilated to create a signal and idler photon pair. The ring may be tuned or de-tuned to the pump wavelength. When tuned to the pump wavelength the pump light gets coupled into the ring which in turn allows a photon pair to be created in the resonator at resonances either side of the pump resonance. By de-tuning the ring away from the pump resonance, the pump light does not couple into the ring and form a resonant wave, therefore inhibiting the generation of photon pairs being generated in the ring. The photon pair in the resonator gets created at the resonances either side of the pump resonance of the ring.

The signal and idler photons may couple out of the ring into the bus guide. However, unlike the pump photons which destructively interfere with incoming pump light travelling along the bus guide, the signal and idler photons do not destructively interfere as they are at a different wavelength to the pump light.

The resonant wavelengths of the ring cavity may be tuned in any suitable way. One method is to change the refractive index of at least a portion of the cavity by applying an electric field, for example applying an electric field to a portion of the resonant cavity that comprises an electro-optic material with a $\chi^2$ nonlinearity (for example Lithium Niobate, GaAs or stressed silicon). The waveguide may be either fully composed of the $\chi^2$ material, and preferably being mode matched to the input/output waveguides, or may be composed of the $\chi^2$ material and one or more further waveguiding materials (such as a different core material), wherein the waveguiding structure is configured such that there is partial overlap between the optical mode and the $\chi^2$ material, for example by adding a layer of $\chi^2$ material on the top, or on the side of the core, or by partially replacing the core of the waveguide by the $\chi^2$ material (for example replacing an entire section of the core along the length of the waveguide).

Another example of tuning the resonant wavelength in the cavity includes changing the refractive index of at least a portion of the cavity using carrier injection. This may be accomplished by having at least a portion of a P-(i)-N junction within the cavity and introducing charge carriers to the P-(i)-N junction to locally change the refractive index. The refractive index may also be changed in the cavity using carrier depletion.

In another example, the ring resonator photon pair source may have a thermo-optic heater tuning means deposited on top of the ring structure. By changing the local temperature of the core material of the ring photon pair source, the refractive index changes, which in turn changes the wavelengths at which transmission minima occur. The wavelengths at which transmission minima occur are the wavelengths that constructively interfere within the ring. Using the thermo-optic effect is one example of changing the refractive index of the ring, however in principle any mechanism may be used to induce an optical path length change in the optical resonator.

One preferred wavelength range of operation for an apparatus used a ring optical source is: 1400-1700 nm. A preferable resonator waveguide path length Lc is: 10 µm<L<1000 µm; more preferably 50 µm<L<500 µm.

Pump Light

The pump photons $6a$-$n$ input to the photon pair sources $4a$-$n$ may be generated by one or more of any suitable pump light source. The pump light source may be part of the apparatus 2 or it may be separate from (but optically linked to) the apparatus 2. Examples of pump light sources include tunable lasers; distributed feedback (DFB) lasers or any other laser. Preferably the pump light source outputs pulses of light. These pulses may be generated by the pump source itself or may be generated by passing the pump light (for example Continuous Wave (CW)) light through an optical modulator such as an electro-absorption modulator (EAM) or Mach-Zehnder modulator (MZI). Preferred pulse widths T (at the Full Width Half Maximum, FWHM) of pump pulses are 10 µs>T>100 fs, more preferably: 100 ns>T>0.5 ps.

Preferably the pump pulses are configured to be controllably input into the photon pair sources, or into the apparatus such that a user or a remote system may select when one or more pump pulses are input. For example, a user provides an input via an electronic switch to the pump source/s to output a pump pulse/s into the apparatus to initialise the process of photon pair conversion.

The pump light configured to be received by the separate photon pair sources may be generated from a single pump source or multiple pump sources.

Unconverted pump light exiting from one photon pair source $4a$-$n$ may be routed to a beam dump (or otherwise not used), or alternative may be input into a further photon pair source $4a$-$n$. The apparatus 2 may be configured such that pump light from a particular pump light source is received by a plurality of photon pair sources $4a$-$n$ by using unconverted pump light exiting one photon pair source $4a$-$n$, as described above, and/or by the pump light amplitude being spatially split into a plurality of optical channels, each feeding a different photon pair source $4a$-$n$.

Preferably the pump source is a laser source outputting coherent monochromatic pump photons or near monochromatic pump photons which are Fourier transform limited. The pump source may output either pulsed or continuous wave light. The pump source 4 may be wavelength tunable. In principle, the pump source 4 may output any photon wavelengths. In some examples the pump wavelength $\lambda$ is preferably: 0.2 µM<$\lambda$<2.5 um; more preferably: 1.3 µm<$\lambda$<2.3 µm.

Pump pulse energy E input into the photon pair sources $4a$-$n$ may be any suitable power. In some examples the pump pulse energy (E) is preferably 10 aJ<E<100 pJ; more preferably: 10 fJ<P<10 pF.

If the photon pair source $4a$-$n$ uses SPDC, or another nonlinear effect creating a signal and idler photon from a single pump photon, then a preferred range of pump wavelength would be 390 nm-450 nm, more preferably 402-406 nm.

If the photon pair source uses four wave mixing or another nonlinear process using two pump photons to generate a signal/idler photon pair, then preferred pump photon wavelengths would be between 1200 nm-2000 nm, more preferably 1500 nm-1600 nm.

For four wave mixing in the near IR, it is preferable to get the photons generated in the transparency bandwidth of silicon which extends beyond 3 um.

Detectors

The one or more detectors $16a$-$n$ used in the apparatus 2 to detect the signal/idler photons may be any optical detector 116 in principle that can generate an electrical signal from the absorption of a photon. Preferably the detectors $16a$-$n$ are single photon detectors that have the capability 9 of detecting a single photon.

Preferred types of detector include avalanche photodiodes when the heralding photon has a wavelength within a 40 0 nm to 900 nm bandwidth.

Another preferred detector in the range of 400 nm to 3 um is a superconducting nanowire single photon detector which provides desirable jitter, deadtime and repetition rate.

Preferably the detector is a single photon detector (SPD) integrated with the apparatus 2. For example, if the apparatus 2 is formed upon or as part of a chip, the SPD is integrated either monolithically or hybrid integrated with the chip.

Optical Filter

In some examples described herein, the unconverted pump photons output from the photon pair sources 4a-n are filtered out (i.e. separated) from the same channel as the control photon before the control photon reaches the detector. This may be achieved using any filtering mechanism or component/device in principle. One or more pump filters 38 may be used. The one or more pump filters 38 may be disposed at any location in the optical paths of the signal/idler photons from the photon pair source 6 to the detectors 14, 16. Preferably the filter 38 comprises an optical bandpass characteristic.

In one example the optical filtering of the pump light may be accomplished by filtering out the signal and idler photons into one or separate optical channels.

Preferably the pump filter extinction should be between greater than 70 dB, more preferably 90-160 dB.

Further Examples

The following examples shown in FIGS. 5-10 may be modified with or according to any suitable feature or configuration described elsewhere herein.

FIG. 5 shows an example of an apparatus 2 comprising a plurality of photon pair sources 4 numbering 4a, 4b, 4c-4n. Each one of the photon pair sources receives pump light from separate laser sources (not shown in the diagram). Equally the separate source of pump photons may be derived from a single pump source. The pump light from each laser source is labelled 6a, 6b, 6c etc wherein the pump light 6a is input into photon pair source 4a, the pump light for photon pair source 4b is pump light 6b and the pump light for photon pair source 4c is the pump light 6c. The photon pair sources 4a-n in this example are substantially identical nonlinear crystals whereby the pump light converts pump light photons into signal and photon pairs using spontaneous parametric down conversion.

In this example, the signal photon and idler photons are output with different k-vectors from the photon pair source so that they are emitted from the crystal along different spatial trajectories. The control photon is propagated outwardly from the first photon pair source 4a along an optical path 28a. A single photon detector 16a is used to detect the photon control output along the optical path 28a. Upon detecting a photon along the optical path 28a, the single photon detector 16a outputs an electrical signal which is fed forward along feed forward signal path 30a to the next subsequent photon pair source 4b. The electrical signal output along the feed forward path 30a is used to directly modify the properties of the photon pair source 4b. This may be done in any particular manner, including applying a thermal change to the crystal causing the tuning of the signal and idler wavelengths. It is understood that other electronic/electrical devices may be used to provide a suitable electrical signal to cause the tuning of the photon pair source 4b, however such components are not shown in FIG. 5. The output of the signal and the idler photons from photon pair source 4a in this example may be coupled into an optical fibre (not shown) so that they can be directed towards further components respectively. This coupling may be achieved by any suitable means including using a suitable lens system for focusing light into the end of an optical fibre. The unconverted pump light exiting the photon pair source 4a is output along a trajectory that is not captured by the separate optical fibres that capture each of the signal and idler photons of the pair, such that the pump light does not propagate to the detectors 16a-n, nor along the common optical path 20. The sister photon of the control photon output from the photon pair source 4a is coupled into a separate optical fibre along optical path 20, which is then passed through an optical delay 32a before being input into the further photon pair source 4b.

The optical delay 32a is used to synchronise the tuning of the second photon pair source 4b with the arrival of any sister pulse created in photon pair source 4d and the arrow of the next pump pulse 6b. The pump pulses 6a-6n are delayed in their arrival time at the sources 4a-n to be synchronised with the tuning of the source and the arrival of a sister photon from the previous source. Therefore, the delay 32a comprises an optical path length corresponding to the time taken for all of; the control pulse to exit the photon pair source 4a and be detected by single photon detector 16a; the detector 16a converts the control photon to an electrical signal; the said electrical signal to reach the second photon pair source 4b (including any further processing of the electrical signal required); the time it takes the electrical signal to cause the necessary change in the photon pair source 4b.

The optical delay 32a is therefore configured to have an optical path length such that the time it takes the sister photon to exit the first photon pair source 4a and enter the second photon source 6b is synchronised to just after the second photon pair source 4b is tuned as a result of the detector 16a detecting the control pulse.

The optical delay lines described for this example and other examples herein may have any suitable length L. In some examples this length L is preferably: 1 ps<L<100 ns; more preferably 10 ps<L<10 ns.

The second photon pair source 4b and its corresponding output optical fibre are set up in a similar manner to those of the first photon pair source 4a. Thus the output fibre of the second photon pair source 4b are positioned to capture photon pair wavelength identical to that of photon pair generated by the first photon pair source 4a.

By de-tuning the second photon pair source 4b, the input pump light 6b is caused to only be converted into photon pairs with wavelengths, hence different k-vectors, to those of the photon pairs permitted from photon pair source 4a. As such, the photon pairs converted in photon pair source 4b will have different output k-vectors, therefore different trajectories and therefore will not be captured by the corresponding optical fibres coupling the signal and idler photons output from photon pair source 4b (which are configured to couple signal and idler photons having a trajectory corresponding to the wavelength of the signal idler photons output from photon pair source 4a).

The pump light 6b and the sister photon output from photon pair source 4a may be input into the second photon pair source 4b by any suitable means, including, for example being coupled into a single optical fibre wherein the single optical fibre is coupled by a lens system into the second photon pair source 4b. Output light from the second photon pair source 4b is captured in a similar way to the output of light from the first photon pair source 4a whereby the control photon is coupled into an optical path 28b which leads on to a single photon detector 16b.

The pump light 6a is a pulse travelling within a particular time window and, if in that particular time window a photon pair is not created by photon pair source 4a then a control photon will not be omitted from photon pair source 4a and therefore the single photon detector 16a will not detect a photon. There will consequently be, for that time window, no electrical signal to input to the second photon pair source 4b to de-tune the second photon pair source 4b away from the nominal signal and idler photon wavelengths. Therefore, pump light photons 6b may be converted by the second photon pair source 4b into signal and idler photons having wavelengths that are similar or identical to the wavelength for the signal and idler photons for the first photon pair source 4a. If a photon pair is created in photon pair source 4b, the control pulse in the photon pair will enter optical path 28b and be detected by single photon detector 16b. Similarly, the output sister photon of the pair will run along optical path 20 and through the second optical delay 32b in a similar fashion to optical delay 32a.

The optical apparatus 2 is therefore set up to capture from any of the photon pair sources 4a-4n sister photons having a particular wavelength and propagate that sister photon along a common optical path 20 whereby that sister photon goes through an optical delay 32 and then is input into the next photon pair source 4 and output again from that photon pair source into the next section of the optical path 20.

In this manner, each photon pair source is configured to capture any photon generated at the desired wavelength and propagate it along the common optical path 20. As shown in FIG. 5, each source 4a-n has the ability to affect the tuning of (hence wavelengths of photon pairs generated by) the next optical source in the chain. For example, in FIG. 5, if no signal and idler photon pairs are created in photon pair source 4a then photon pair source 4b is continued to be allowed to generate photon pairs at the same wavelengths as photon pair source 4a. If photon pair source 4b does generate a photon pair then the control photon of this pair propagates along path 28b which in turn is detected by detector 16b and used to de-tune the next photon pair source 4c so that any photon pairs generated by source 4c in the de-tuned time window will be de-tuned and therefore will not be captured by the optical path 20 and 28c. This operation is continued along the chain of photon pair sources 4 until the end of photon pair source 4n. The output of a sister photon (resulting from any of the sources 4a-4n) along optical path 20 from source 4n is the output from the optical apparatus 2. This sister photon may have been generated by any of the photon pair sources 4a-4n. An optical detector 4n is shown in FIG. 5, however such a detector may not be required.

This method of operating the apparatus may be termed active feedforward mode whereby the heralding signal determines which photon pair source emitted the first photon pair. Then, via optical delay of the idler photon, the invention uses a feed-forward signal initiated by the successful heralding detector to control subsequent photon pair emissions.

Figure 6:
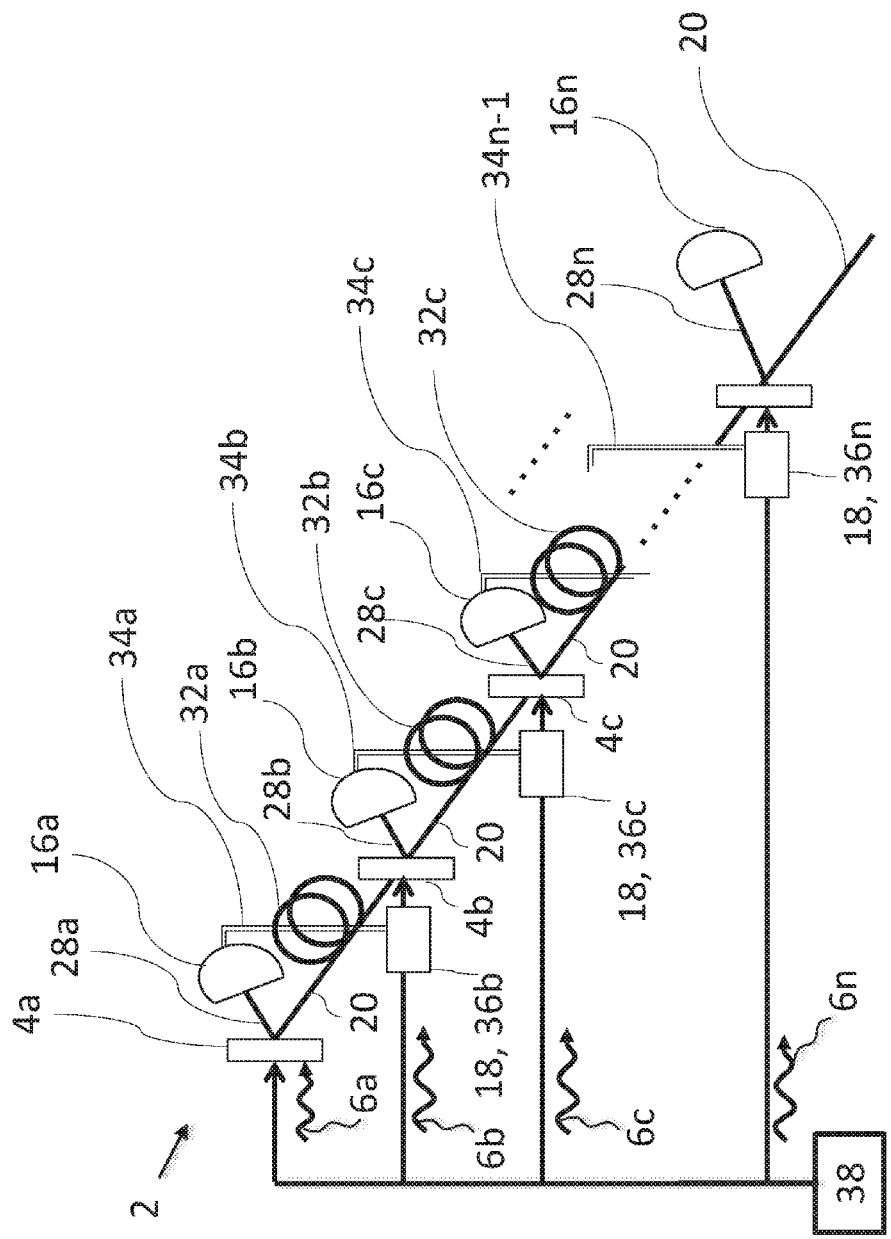
FIG. 6 illustrates an example of an optical apparatus described herein and configured to use a photon from a photon pair to control the conversion of photon pairs in other photon pair sources.

Alternatively, the same apparatus 2 may operate in a 'passive' mode where each photon pair source is allowed to create photon pairs without being inhibited by a control signal resulting from the detection of a previous control photon earlier in the optical circuit. In the passive mode, the number of detectors 16 that fire tells the user how many photons are emitted into the common mode along the common path 20. This also reveals information as to which pair sources 4a-n were the ones to emit photon pairs FIG. 6 shows a further example of an optical apparatus 2 as described herein. The optical apparatus 2 shown in FIG. 6 is similar to the optical apparatus 2 shown in FIG. 5 wherein like numerals represent like components. The difference between this example and the example shown in FIG. 5 is that the pump source used in FIG. 6 is a common pump source 38, whereby an optical pulse output from the source 38 is split into a number of different input 56a-56n, wherein each input is received by a separate photon pair source 4a-4n. The second and further photon pair sources 4b-n along the chain of photon pair sources 4a-4n are preceded by a control device 18. In this example, the control device 18 is an optical modulator 36b-n. Each optical modulator 36b-n is configured to be controlled by the feed forward paths 34a-(n−1) so that the pump pulse may be switched off or otherwise have its amplitude reduced to entering the source 4b-n to an equitable negligible value if a control photon is detected from the previous source 4a-n in the chain. Therefore, for example, if a photon pair is generated using pump pulse 6a then the control pulse 28a is successfully input into detector 16a which in turn sends an electrical signal along feed forward path 34a to control the modulator 36b to absorb or otherwise switch out the incoming pump pulse 6b. Because the pump pulse 6b does not enter the second photon pair source 4b, this source 4b does not output any photon pairs (at least none of the wavelengths configured to be captured by optical paths 28 and 20).

The electrical signal output from the detector 16a, would also be used to control the further modulators 36c to 36n along the chain so that other pump pulses 6c to 6n are also not received by photon pair sources 4c to 4n if a photon pair was generated by source 4a (however such electrical circuitry is not shown in FIG. 6). The control device 18 in this example does not have to be a modulator 36, but can be any suitable device for controlling the pump pulse 6 amplitude going into each success photon pair source 4, for example a high speed shutter.

In the examples of FIG. 5 and FIG. 6 it is envisaged that the output from the photon pair sources 4 may not necessarily need to be captured by optical fibres. In one alternative implementation, any one or more of the optical paths may be a free space path wherein the optical delays 32a to 32n−1 are implemented using free space bulk optics (for example using mirrors to implement the suitable delay).

Figure 7:
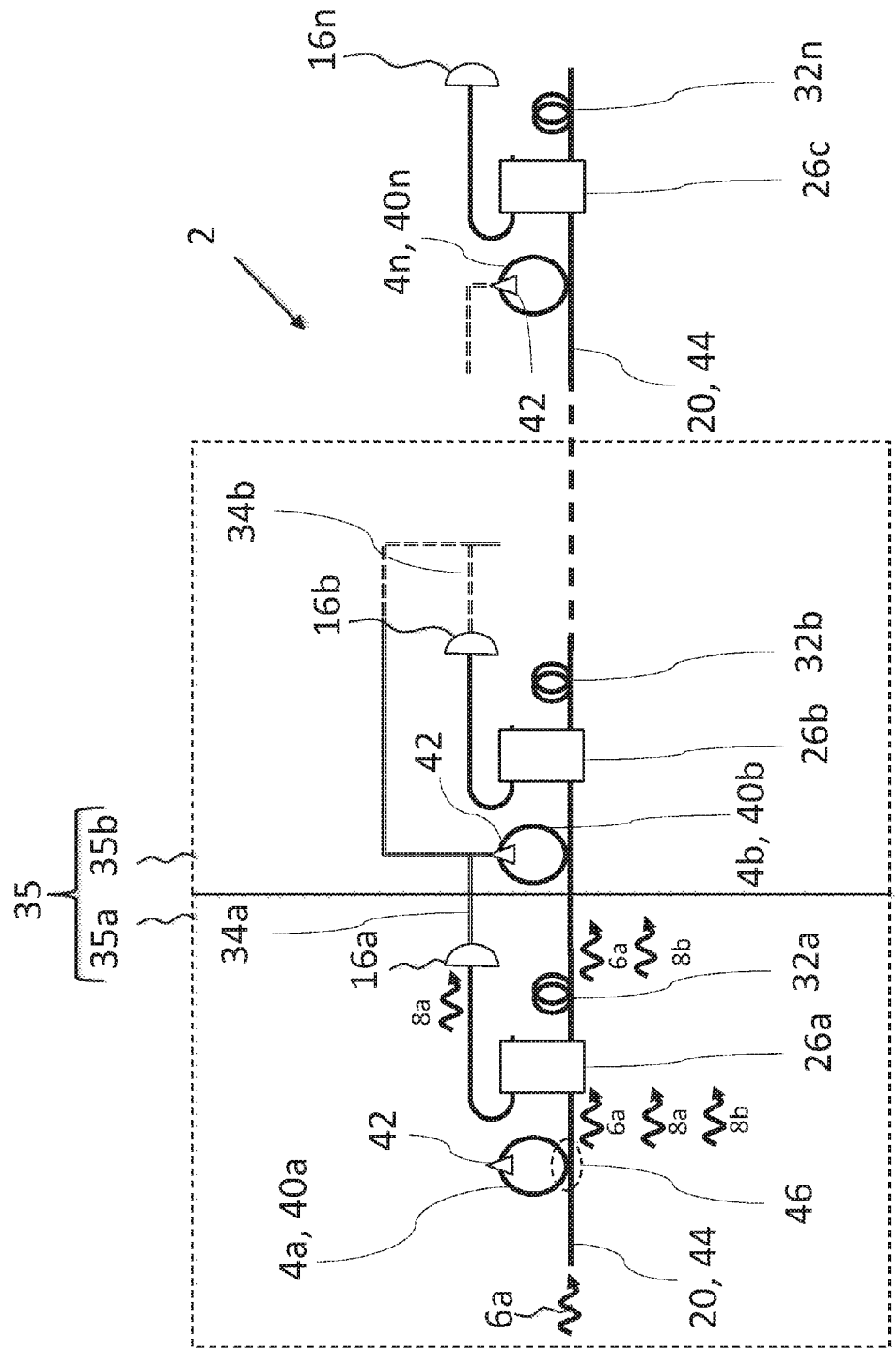
FIG. 7 illustrates an example of an optical apparatus described herein using ring resonator photon pair sources.

FIG. 7 shows a further example of an optical apparatus 2. In this example, the optical apparatus 2 comprises a plurality of photon pair sources 4a-n wherein the photon pair sources in this example are integrated optic ring resonators 40a-n. Each of the integrated optic ring resonators 40a-n comprises a tuning element 42 that can be tuned via an electrical signal to change the resonant frequencies of the ring. Pump light photons 6a from a single pump light source (not shown in the diagram) are entered along a common optical path 20, which in this example is an integrated optic waveguide 44.

Preferred values for ring resonator source include using a 1 ps pump pulse; a ring source free spectral range of 400-800 GHz; and a cavity Q factor of preferably: 1000<Q<50000.

The idler wavelength may be based upon the following condition:

$$\Delta\upsilon < \upsilon p - \Delta\upsilon i - \Delta\upsilon p \qquad [8]$$

Wherein: $\Delta\upsilon i$ is the bandwidth of the idler resonance output from the ring, $\Delta\upsilon$ is the bandwidth of filter response for filtering the idler where $\Delta\upsilon > \Delta\upsilon i$; and Amp is the pump bandwidth at −130 dBm.

In this example, each of the integrated optic ring resonator sources 40a-n are substantially similar in that in absence of an electrical signal to the tuning element 42, the integrated optic ring resonator has couples in the pump light 6a from the integrated optic waveguide 44 at a coupling region 46. Pump light then propagates around the ring and may generate a signal and idler photon pair 8a, 8b. The pump photons 6a together with the photons of the signal and idler photon pair 8a, 8b are then coupled out of the ring, for example see the first integrated optic ring resonator 40a where the photons 6a, 8a and 8b are shown to propagate onward from the coupling region 46 and along wavelength 44. The optical path 20 upon which the pump light photon 6a and the photon pair 8 propagate onward from the integrated optic ring resonator 40a is then input to a filter component configured to separate the signal photon 8a from the unconverted pump photons 6a and idler photon 8b. This filter component 26a may be any suitable filter component, for example a Bragg grating reflector; an integrated optic unbalanced Mach Zehnder interferometer; or an integrated thin film filter. Other suitable filters may include one or more further ring resonators and/or a cascaded lattice filter (i.e. a filter composed of directional couplers and phase-shifters).

If a photon pair 8 is created by the first ring resonator 40a, then the signal photon 8a exiting the ring resonator 4a will be output separately to the signal photon 8b and the pump photons 6a. The signal photon then follows an optical path towards a first single photon detector 16a.

Upon detecting the photon 8a, single photon detector 16a creates an electronic signal which is then used to control (via tuning element 42) the further ring resonator photon pair sources 40b to 40n within the optical apparatus 2.

Upon exiting the filter component 26a, the remaining pump photons 6a and the sister photon of the photon pair 8 (i.e. the idler photon 8b) then propagate along an output waveguide 44 and through an optical delay loop 32a. The delay loop 32a is used in a similar fashion to the delay loop used in previous examples, i.e. to synchronise the tuning of the next ring resonator 40b with the incoming pump light photon 6a (which can be termed 6b when entering the second ring resonator) and idler photon. Therefore a single photon 8a is generated and detected by the detector 16a, the next ring resonator device 40b (and the further rings 40c-n) is tuned off the original resonance so that the incoming pump light photons 6b and the idler photon 8b do not correspond to any of the resonances within the photon pair source ring resonator 40b. Because the next ring resonator 4b has no resonances at the idler 8b and pump 6a/6b photon wavelength, these photons propagating along the common path waveguide 44 do not interact with the second photon pair ring source 40b but simply go straight into the next filter component 26b (which is equivalent to filter component 26a). Since no new photon pairs have been generated by the second photon pair ring source 40b, there is no signal photon to be filtered out by filter component 26b and therefore the original idler photon 8b and any synchronising pump light photons 6a continue propagating along the common waveguide path 44. The electrical signal generated by detector 16a is also used to de-tune the ring resonator photon pair sources along the chain so that when the pump photons and the idler photon 8b travelling on path 20 are incident upon each new photon pair source the tuning is synchronised so that each ring resonator source 40 is de-tuned so that the pump light photons and idler photon 8b are not coupled into the photon pair sources 40 and simply propagate along the common waveguide path 44 until their output from the optical apparatus 2.

If however the first photon pair ring source 40a does not generate a single and idler photon pair 8 when the pump pulse 6a is coupled into the ring, then no signal photon 8a is generated, hence no signal photon will be incident upon the first single photon detector 16a. The second photon pair source 40b therefore is not caused to tune away from the pump wavelength. Therefore, when the pump pulse 6a exit the optical delay loop 32a it then couples into the second integrated optic ring resonator source 40b therefore providing a chance for this particular source 40b to generate a signal and idler photon pair. Again, similarly to the first photon pair source 40a, if a photon pair is generated from the second photon pair source 40b, the signal photon will be filtered by filter component 26b and directed to detector 16b which then generates an electrical signal used to control all of the other further photon pair ring sources 40 along the chain so that they are synchronised to de-tune away from the pump wavelength when the pump photons are incident upon the said further rings 40.

FIG. 7 shows dotted lines in a plurality of boxes 35 which denote cells 35a, 35b. The components that forming the cells 35 in this example (and in other examples herein), hence how the cells are defined may change, however, generally, a cell" may be an ensemble of components having at least one optical input and at least one optical output. The apparatus may be defined by cascading N cells (N is an integer>1) where the term cascading is intended to mean connecting an optical output of one cell to the input of the next cell. The output of the last cell is not connected and becomes the output of the device. The input of the first cell is the one in which the pump is launched (in some examples the pump light is launched into each cell individually).

The first cell comprises the integrated optic waveguide 44 that acts as a common path 20; the first photon pair ring resonator source 40a (with its tuning element 42), the filter component 26a; the optical delay line 32a and the single photon detector 16a together with its feed forward electrical path 34a. The second subsequent cell 35b has similar components that of 34. Each cell 35 in the optical apparatus comprises similar components as to cell 35a and 35b. The optical apparatus may therefore be described as comprising a plurality of such cells 35 connected to each other wherein the first and last cell may comprise some differences due to being at the ends of the chains (for example first cell 35a may not comprise tuning element 42 whilst cell 35n may not comprise the delay 32n and/or the detector 16n).

Some advantages of this particular configuration of optical apparatus 2 include the following; the user uses only a single optical pulse for each of the photon pair sources 40a-n (which reduces the number of input waveguides within the optical apparatus 2 that are connected to separate pump photon inputs), a single filter component that only needs to filter out the signal photons generated from any of the photon pairs; an integrated optic configuration which provides the optical apparatus 2 with a small foot print compared to bulk of fibre devices.

The integrated optic ring resonator photon pair sources 40a-n may take any configuration including having multiple coupled ring resonators thus achieving a Vernier effect, whereby any one or more of the coupled ring resonators may have a tuning element 42. The ring resonator device may not necessarily have an in-plan shape of a ring but may be any suitable closed loop path such as a race track. Alternatively or in addition, the ring resonator device may be a micro disc resonator.

The optical delay lines 32a to 32n may take any configuration including a serpentine configuration within the integrated optic device, for example these delay lines may be held off chip whereby the common path waveguide 44 is coupled to a loop of optical fibre which then couples back into the optical path integrated waveguide 44 connecting the next photon pair source 40.

The filter components 26a to 26n may be any filter component as described herein. The photon detectors 16a to 16n may be integrated (either monolithically or hybrid integrated) within the same integrated optic device or they may be coupled onto an edge of the integrated optic device or be coupled from the integrated optic device via free space or via an optical fibre connection. The electrical feed forward circuitry 34a to 34n again may be formed as part of the same integrated optic device or may be provided for off chip.

Figure 8:
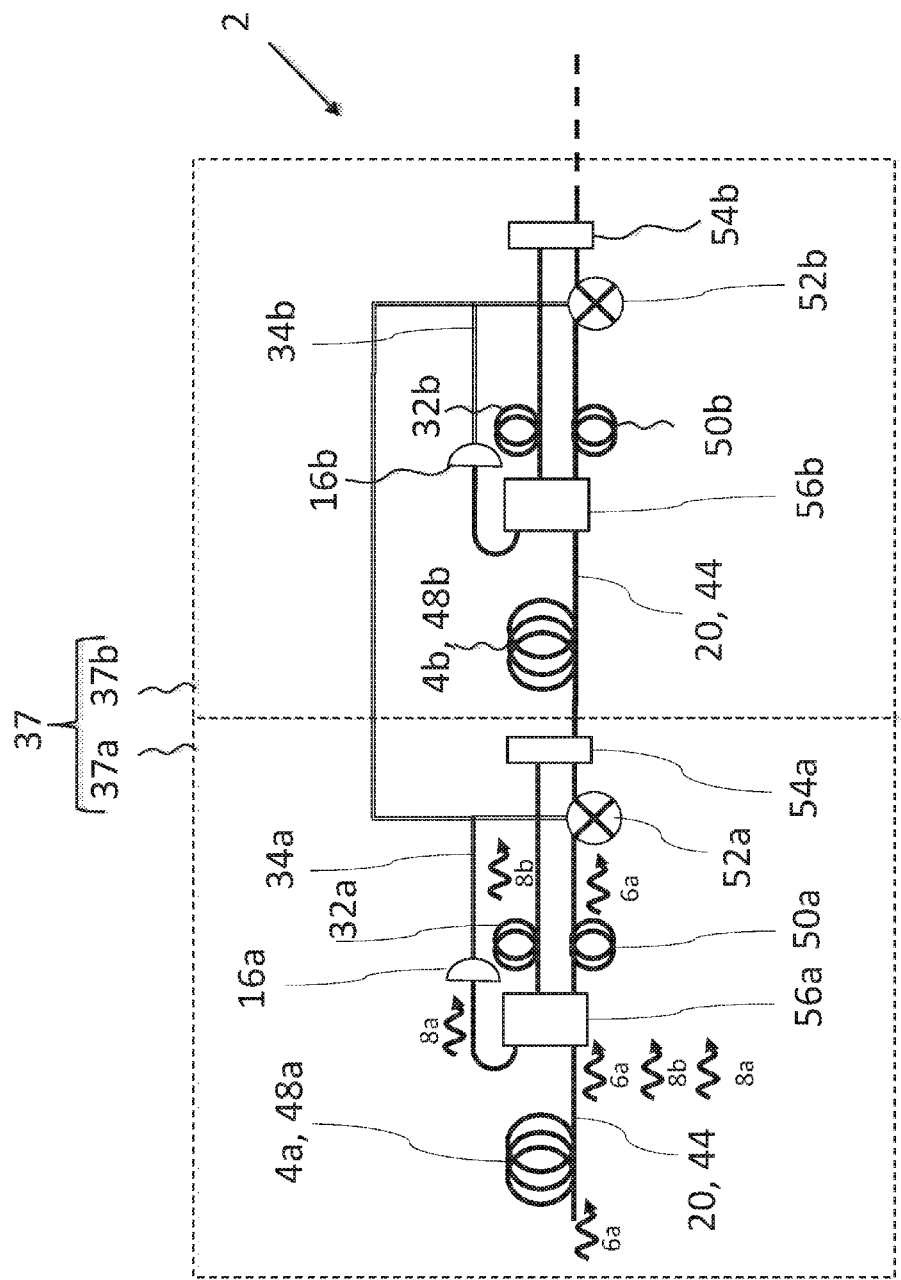
FIG. 8 illustrates an example of an optical apparatus described herein using photon pair source comprising elongate lengths of integrated optic waveguides.

FIG. 8 shows a further example of an optical apparatus 2. FIG. 8 is similar to FIG. 7 where like numerals present like components. This example may also be defined as a plurality of optically and electrically connected cells 37 wherein cell 37a is the first cell. The differences with this particular example is that the photon pair sources 4a to 4n are not ring resonator sources but elongate lengths of waveguides 48a-n suitable for converting pump light photons into signal idler photon pairs 8a, 8b. In this example, the common optical path 20 is again an optical waveguide 44 wherein the elongate loops of waveguide that form the photon pair sources 48a-n form part of this common path 20.

Unlike the filter device used to filter the signal photon away from the idler photon in FIG. 7, this configuration in FIG. 8 has a different filter component 56a which filters signal photon, idler photon and pump photons into spatially separate output channels. The pump photons and idler photons are then passed through optical delay lines 32a, 50a for synchronisation (as discussed above) wherein the optical path of the pump photons after exiting the delay loop 50a are then incident upon an intensity controlling device 52a (for example a shutter or a modulator). This modulator 52a is controlled by an electrical signal generated by the single photon detector 16a upon detection of a signal photon. If a signal photon 8a is detected by detector 16a then the output electrical signal that is fed forward on path 34a is firstly used to control the modulation device 52a to reduce or shut off the pump photons propagating further through the circuit and also to optionally shut off further modulator devices 52b to 52n further along the circuit. The output of the first modulator 52a then directs any photons of the pump source (passing through modulator 52a) into an optical combiner which combines any photons propagating along the output of the filter 56a corresponding to the wavelength of the idler photon 8b. The optical combiner therefore may receive pump photons 6a and any generated idler photons 8b and combine them into a single optical path.

An example of an optical combiner 54a is an integrated optic unbalanced Mach Zehnder interferometer an arrayed waveguide grating. If the photon pair source 48a does not generate a photon pair 8, then no signal photon 8a will be incident upon detector 16a and therefore no electrical signal will be fed along path 34a to control the modulation of the modulator 52b. Therefore the modulator 52b will allow the pump photons 6a to go through the modulator 52a and be incident upon the optical combiner 54a which then outputs the pump light photons into a further photon pair source 48b in the next cell 37b.

If however the first photon pair source 48a does generate a photon pair 8a, 8b then signal photon 8a will be detected by detector 16a which in turn causes an electrical signal to propagate along feed forward electrical channel 34a to control the modulator 52a to shut off or otherwise remove pump photons from propagating further along the optical path 20 towards the second photon pair source 48b. However, the idler photon 8b will propagate around the optical delay line 32a and through the optical combiner 54a to be incident upon the photon pair source 48b of the next cell 32b.

Each cell operates in a similar manner such that as soon as a photon pair is generated, the idler photon of that pair is allowed to simply propagate through the rest of the integrated optic circuit and out of the optical apparatus 2 without having to go through a switch whilst the corresponding signal photon is used to turn off any further photon pair generating in the same time window, in further sources down the chain.

Figure 9:
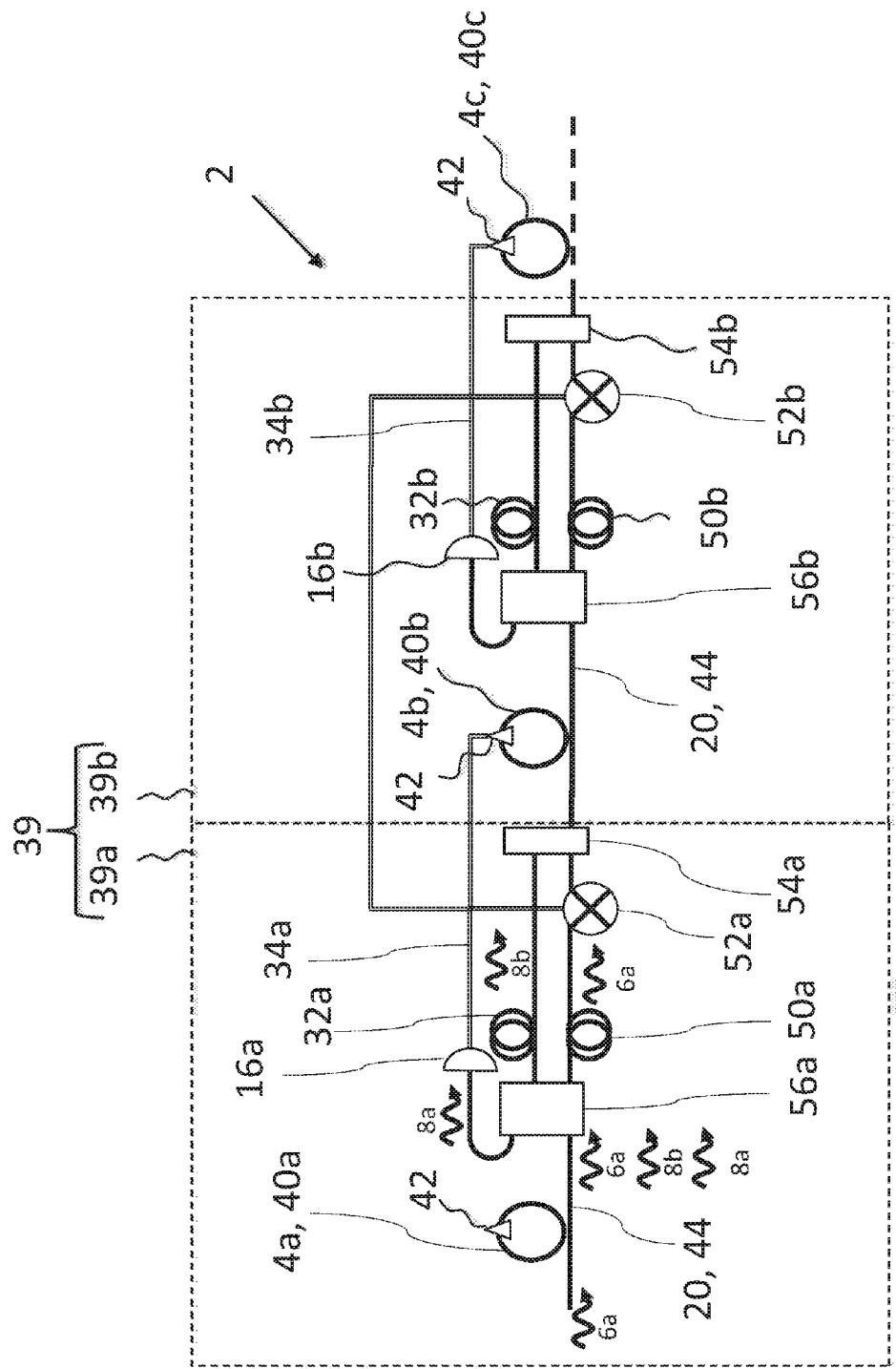
FIG. 9 illustrates an example of an optical apparatus described herein using ring resonator photon pair sources wherein a photon from a photon pair is used for controlling further ring resonator photon pair sources and a pump light control device.

FIG. 9 shows an example of an optical apparatus 2. In this example, the optical apparatus 2 comprises similar components as described for FIGS. 7 and 8 wherein like numerals correspond to like components. In this example, the photon pair sources 4a to 4n are integrated optic ring resonator photon pair sources 40a-n similar to those described with reference to FIG. 7. The arrangement of the filter 56a following the photon pair source 4a, as used in FIG. 8, is correspondingly used in this example where the filter is configured to separate pump photons, signal photons, idler photons along separate output channels. Again similar to FIG. 8, the pump photons propagate along an optical path 20 through an optical delay 50a and onto a switch or modulation device 52a that may switch off the pump pulse or otherwise prevent the pump pulse propagating further through the optical apparatus 2 if a signal photon 8a is detected by the detector 16a. Similarly to FIG. 7, the feed forward electrical signal (along electrical line 34a) generated by detector 16a is used to also control the one or more further photon pair sources 40b-n in the apparatus 2. Therefore, if the photon detector 16a detects the signal photon 8a, the resulting electrical signal is used to both shut off the pump pulses propagating further within the optical circuit and onto the further photon pair sources 40b-n and also to de-tune these photon pair sources 40b-n so that if any residual pump light does continue to propagate through the optical paths of the circuit, then the photon pair source 40b will be tuned so as not to couple in the pump pulses and therefore prevent generating further photon pairs.

One of the advantages of this particular configuration is that it provides a double facility of the pump light photons being converted into further photon pairs if a photon pair was generated successfully in a previous photon pair source 40a-(n−1) in the optical apparatus 2.

FIG. 9 further shows that the optical apparatus 2 may be divided into a plurality of cells 39 wherein, for example, cell 39a comprises the photon pair source 40a, the filter 56a, the optical detector 16a, the optical delay lines 32a and 50a, the optical combiner 54a and the modulation/switch device 52a, together with any associated optical paths for directing photons to and from these components and any electrical circuitry associated with the detector 16a and the feed forward electrical circuitry 34a. Similarly, cell 39b has equivalent components to cell 39a.

Figure 10:
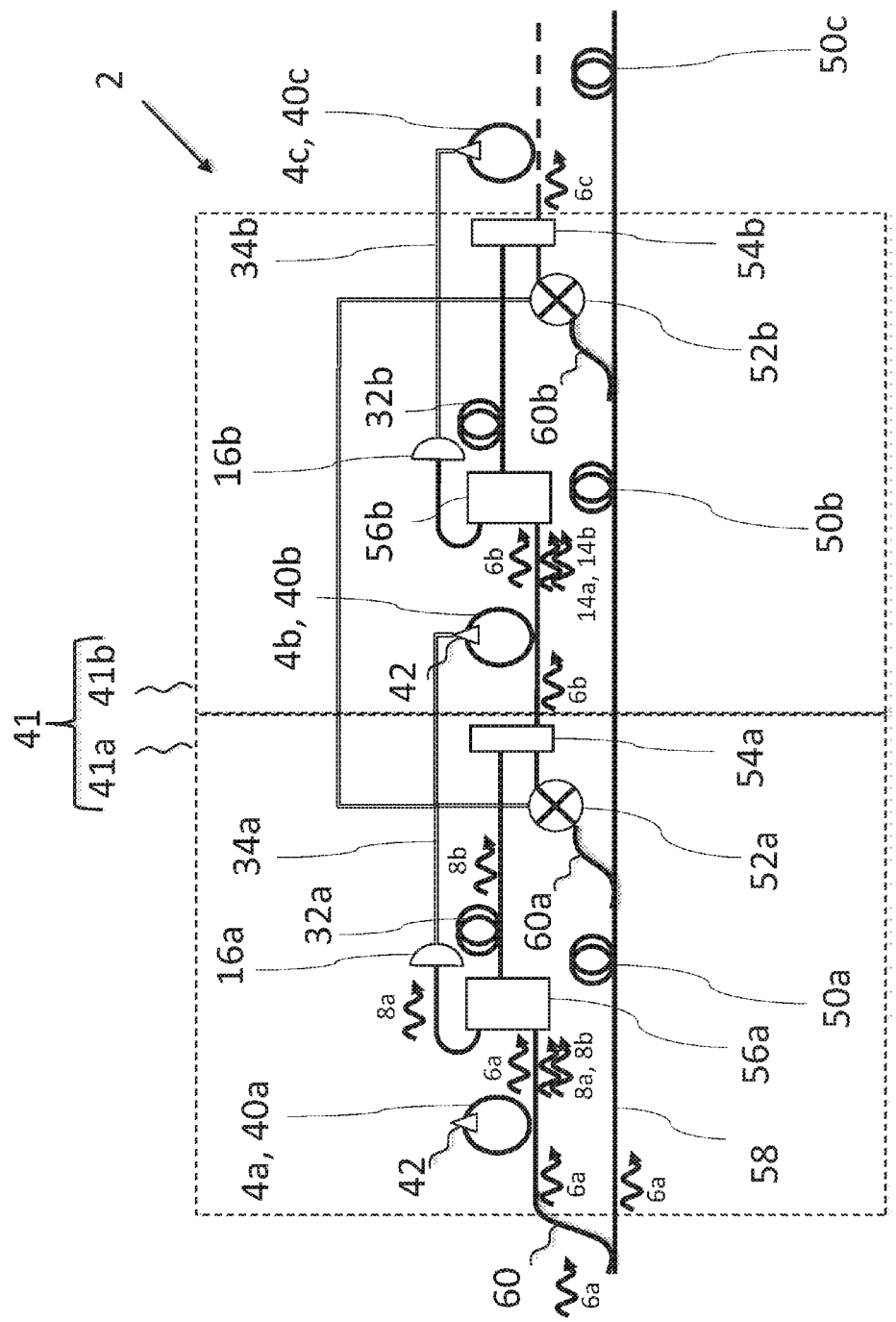
FIG. 10 illustrates an example of an optical apparatus described herein using ring resonator photon pair sources wherein a photon from a photon pair is used for controlling further ring resonator photon pair sources and a pump light control device.
Figure 11:
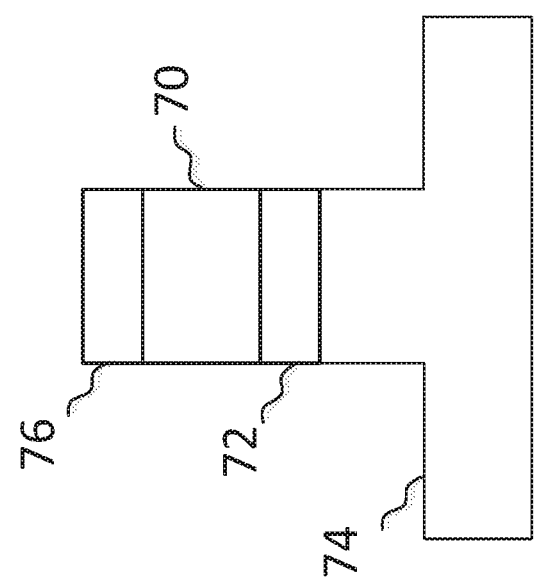
FIG. 11 illustrates an example of a cross section of a waveguide for use with the optical apparatus described herein.

FIG. 10 shows an example of an optical apparatus 2. The apparatus 2 is similar to that shown in FIGS. 7 and 9 wherein like references correspond to like components. In this example, a single waveguide 58 is coupled to a pump light source (not shown) wherein the optical circuit comprises a plurality of optical taps 60a-n whereby each optical tap is used to couple a portion of the pump light from the waveguide 58 and direct that portion to be input to a particular photon pair source 40a-n. In this particular example, the photon pair source is an integrated optic ring resonator, having a tuning element 42.

In each cell 41 there contains an optical filter 56a-n configured to receive unconverted pump photons and any generated photon pairs. The filters 56a-n outputs the signal photon 8a along one optical channel for detection by the single photon detector 16a, and outputs the idler photon 8b along a separate optical channel that inputs into an optical delay 32a similar to FIG. 10.

In this example, the filter 56a is used to remove the pump light 6a from propagating any further through the optical apparatus 2, this may be done by having an output optical channel from the filter 56a that the unconverted pump light 6a can travel along and terminate at (for example with an optical absorber).

The feed forward signal propagating along the electrical channel 34a is, as in FIG. 9, used to control the modulator device 52a for preventing further pump light entering the next photon pair source 40b in the chain. However, in this particular example, the pump light that propagated through the filter 56a is discarded. Instead, a new portion of pump light that has propagated through optical delay 50a along the waveguide 58 is tapped off by a waveguide 60b and input into the modulator sea. The output of the modulator 52a is input into an optical combiner 54a together with a separate optical path carrying the idler photon 8b output from the filter 56a. The output from this optical combiner 54a is then fed into a further cell 41b of the optical apparatus 2, wherein the process of photo pair conversion is carried on as discussed before in previous embodiments and previous examples.

As with FIG. 9, the electrical signal generated by the single photon detector 16a is used to control the modulator 52a to either prevent or allow pump light propagating to the next photon pair source 40b (through optical combiner 54a) and also to control the tuning of the next photon pair source 40b via the tuning element 42.

In a similar manner to FIG. 9, the idler photon generated by the first photon pair source 40a that goes through the filter 56a is propagated through an optical delay 32a. Furthermore, the pump pulse that propagates along the waveguide 58 that was not coupled into waveguide 60a also goes through an optical delay 50a. These delays are used to synchronise the arrival of the idler photon and pump photon into the next cell 41 with respect to the control signals generated by the detector 16a reaching the modulator device 52a and tuning element 42.

In order to address various issues and advance the art, the entirety of this disclosure shows by way of illustration various embodiments in which the claimed invention(s) may be practiced and provide for superior optical apparatus and method for outputting one or more photons. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in the future.

What is claimed is:

1. An optical apparatus comprising:
   a first photon pair source configured to convert at least one pump light photon into a first correlated photon pair, the first correlated photon pair comprising a first signal photon and a first idler photon; and
   a second photon pair source configured to convert at least one further pump light photon into a second correlated photon pair, the second correlated photon pair comprising a second signal photon and a second idler photon,
   wherein the apparatus is configured to use one of:
   the first signal photon; or
   the first idler photon,
   for controlling the conversion by the second photon pair source of the at least one further pump light photon.

2. An optical apparatus as claimed in claim 1, wherein the apparatus is configured such that:
   at least one of the first signal photon or the first idler photon from the first correlated photon pair is output from the first photon pair source onto an optical path; and
   at least one of the second signal photon or the second idler photon from the second correlated photon pair is output from the second photon pair source onto the optical path.

3. An optical apparatus as claimed in claim 2, wherein at least part of the second photon pair source is disposed along the optical path.

4. An optical apparatus as claimed in claim 2, wherein the second photon pair source is separated from and optically coupled to the optical path.

5. An optical apparatus as claimed in claim 2, wherein the apparatus is configured such that the control of the conversion of the at least one further pump light photon comprises a change in the photon pair conversion processes occurring within the second photon pair source, the change being synchronised with the arrival, at the second photon pair source, of the first signal photon or the first idler photon from the first correlated photon pair along the optical path.

6. An optical apparatus as claimed in claim 1, wherein the apparatus is configured to input pump light output from the first photon pair source into the second photon pair source.

7. An optical apparatus as claimed in claim 1, further comprising an optical detector, wherein:
   the apparatus is configured to detect, using the optical detector, the one photon from the first correlated photon pair used to control the conversion of the at least one further pump light photon; and
   the apparatus is configured, upon the optical detector detecting the one photon, to generate an electrical signal for controlling the conversion of the at least one further pump light photon.

8. An optical apparatus as claimed in claim 7, wherein the apparatus is configured to use the electrical signal to temporarily change an optical property of the second photon pair source, the optical property affecting the conversion of the at least one further pump light photon.

9. An optical apparatus as claimed in claim 7, wherein the apparatus comprises a pump light controlling device configured to receive the electrical signal and change the amount of pump light input to the second photon pair source.

10. An optical apparatus as claimed in claim 7, further comprising an optical filter device for spatially separating the first signal photon and the first idler photon, wherein the apparatus is configured to:
 direct one of the first signal photon or the first idler photon from the filter to the detector; and
 direct the other of the first signal photon or the first idler photon from the first correlated photon pair along the optical path,
 wherein the optical path is configured to:
  optically couple with the second photon pair source about a coupling region; and
  direct the other of the first signal photon or the first idler photon towards the coupling region.

11. A method for outputting one or more photons, the method comprising:
 receiving pump light at a first photon pair source, the pump light comprising at least one pump light photon;
 converting the at least one pump light photon into a first correlated photon pair, the first correlated photon pair comprising a first signal photon and a first idler photon; and
 using one of:
  the first signal photon; or
  the first idler photon,
  for controlling the conversion of at least one further pump light photon in a second photon pair source into a second correlated photon pair, the second correlated photon pair comprising a second signal photon and a second idler photon.

12. A method as claimed in claim 11, wherein using the first signal photon or the first idler photon comprises stopping the conversion of the at least one further pump light photon in the second photon pair source.

13. An optical apparatus comprising
 a first photon pair source configured to convert at least one pump light photon into a first correlated photon pair, the first correlated photon pair comprising a first signal photon and a first idler photon; and
 a second photon pair source configured to convert at least one further pump light photon into a second correlated photon pair, the second correlated photon pair comprising a second signal photon and a second idler photon;
 wherein the first photon pair source and the second photon pair source are arranged in an optically linked concatenated series,
 wherein the apparatus is configured such that,
  at least one of the first signal photon or the first idler photon is output from the first photon pair source onto an optical path;
  at least one of the second signal photon or the second idler photon is output from the second photon pair source onto the optical path.

14. An optical apparatus as claimed in claim 13, wherein the apparatus is configured to use one of the first signal photon or the first idler photon for controlling the conversion of the at least one further pump light photon.

15. An optical apparatus as claimed in claims 13, wherein the apparatus is configured such that control of the conversion of the at least one further pump light photon comprises a change in the photon pair conversion processes occurring within the second photon pair source, the change being synchronised with the arrival, at the second photon pair source, of the at least one of the signal or the idler photons from the first correlated photon pair along the optical path.

16. An optical apparatus as claimed in claim 13, wherein the apparatus is configured to input pump light output from the first photon pair source into the second photon pair source.

17. An optical apparatus as claimed in claim 14, comprising an optical detector, wherein:
 the apparatus is configured to detect, using the optical detector, the one of the first signal photon or the first idler photon for controlling the conversion of the least one further pump light photon; and
 the apparatus is configured, upon the optical detector detecting the one of the first signal photon or the first idler photon, to generate an electrical signal for controlling the conversion of the at least one further pump light photon.

18. An optical apparatus as claimed in claim 1, wherein the apparatus is configured to use one of the first signal photon or the first idler photon converted by the first photon pair source to prevent the second photon pair source from generating the second correlated photon pair.

19. An optical apparatus as claimed in claim 13, wherein the apparatus is configured to use one of the first signal photon or the first idler photon converted by the first photon pair source to prevent the second photon pair source from generating the second correlated photon pair.

20. An optical apparatus as claimed in claim 7, wherein the apparatus comprises one or more of:
 a modulator; or
 a shutter,
 wherein the one or more of the modulator or the shutter is configured to receive the electrical signal and change the amount of pump light input to the second photon pair source.

* * * * *